US011509809B2

(12) United States Patent
Chen et al.

(10) Patent No.: US 11,509,809 B2
(45) Date of Patent: Nov. 22, 2022

(54) FOLLOWING CONTROL METHOD, CONTROL TERMINAL, AND UNMANNED AERIAL VEHICLE

(71) Applicant: SZ DJI TECHNOLOGY CO., LTD., Shenzhen (CN)

(72) Inventors: Yi Chen, Shenzhen (CN); Baojie Miao, Shenzhen (CN); Zhuo Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 79 days.

(21) Appl. No.: 16/935,875

(22) Filed: Jul. 22, 2020

(65) Prior Publication Data

US 2020/0358940 A1 Nov. 12, 2020

Related U.S. Application Data

(63) Continuation of application No. PCT/CN2018/073626, filed on Jan. 22, 2018.

(51) Int. Cl.
*H04N 5/232* (2006.01)
*G05D 1/12* (2006.01)
(Continued)

(52) U.S. Cl.
CPC ............ *H04N 5/232* (2013.01); *G05D 1/0816* (2013.01); *G05D 1/101* (2013.01); *G05D 1/12* (2013.01)

(58) Field of Classification Search
CPC ........ G05D 1/101; G05D 1/12; G05D 1/0038; G05D 1/0088; G05D 1/0094; G05D 1/0016; G05D 1/0011; G05D 1/0202; G05D 1/0808; G05D 1/0816; G05D 1/0022; G05D 1/0033; H04N 5/232; H04N 5/23203; H04N 5/23216; H04N 5/23299; H04N 5/23219; H04N 5/23296; B64C 2201/127;
(Continued)

(56) References Cited

U.S. PATENT DOCUMENTS 9,164,506 B1 * 10/2015 Zang ..................... G05D 1/0094
10,587,790 B2 * 3/2020 Li ........................ G06F 3/04845
(Continued)

FOREIGN PATENT DOCUMENTS

CN 105676862 A 6/2016
CN 106161953 A 11/2016
(Continued)

OTHER PUBLICATIONS

The World Intellectual Property Organization (WIPO) International Search Report for PCT/CN2018/073626 dated Oct. 31, 2018 7 pages.

*Primary Examiner* — Xuemei Zheng
(74) *Attorney, Agent, or Firm* — Anova Law Group PLLC

(57) ABSTRACT

The present disclosure provides a following control method. The method includes receiving and displaying an acquired image acquired by an imaging device of an unmanned aerial vehicle (UAV); detecting a user's selection operation on two or more objects in the image; determining a following instruction based on the detected selection operation; and controlling the UAV to follow the two or more followed objects indicated by the following instruction so that the two or more followed objects are in an imaging frame of the imaging device.

21 Claims, 10 Drawing Sheets

(51) Int. Cl.
*G05D 1/10* (2006.01)
*G05D 1/00* (2006.01)
*G05D 1/08* (2006.01)

(58) Field of Classification Search
CPC ........ B64C 2201/024; B64C 2201/146; B64C 2201/141; B64C 2201/027; B64C 2201/123; B64C 2201/12
See application file for complete search history.

(56) References Cited

U.S. PATENT DOCUMENTS

2019/0064852 A1* 2/2019 Zhang .................. G06K 9/62
2019/0253611 A1* 8/2019 Wang ................ G06F 3/04845

FOREIGN PATENT DOCUMENTS

| | | |
|---|---|---|
| CN | 106708089 A | 5/2017 |
| CN | 106774301 A | 5/2017 |
| CN | 106970627 A | 7/2017 |
| CN | 107505951 A | 12/2017 |
| WO | 2009010044 A2 | 1/2009 |

* cited by examiner

FOLLOWING CONTROL METHOD, CONTROL TERMINAL, AND UNMANNED AERIAL VEHICLE

CROSS-REFERENCE TO RELATED APPLICATION

This application is a continuation of International Application No. PCT/CN2018/073626, filed on Jan. 22, 2018, the entire content of which is incorporated herein by reference.

TECHNICAL FIELD

The present disclosure relates to the field of unmanned aerial vehicle (UAV) and, more specifically, to a following control method, a control terminal, and a UAV.

BACKGROUND

In conventional technology, a UAV can be used to intelligently follow a target object. However, in scenarios such as group photographing, or ball games or games that involving multiple players, the UAV cannot follow multiple target objects, thereby limiting the photograph scenes of the UAV.

SUMMARY

One aspect of the present disclosure provides a following control method. The method includes receiving and displaying an acquired image acquired by an imaging device of an unmanned aerial vehicle (UAV); detecting a user's selection operation on two or more objects in the image; determining a following instruction based on the detected selection operation; and controlling the UAV to follow the two or more followed objects indicated by the following instruction so that the two or more followed objects are in an imaging frame of the imaging device.

Another aspect of the present disclosure provides A control terminal of a UAV. The control terminal includes a communication interface configured to receive an acquired image acquired by an imaging device of the UAV; and a processor configured to: display the acquired image acquired by the imaging device of a UAV; detect a user's selection operation on two or more objects in the image; determine a following instruction based on the detected selection operation; and control the UAV to follow the two or more followed objects indicated by the following instruction so that the two or more followed objects are in an imaging frame of the imaging device.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

REFERENCE NUMERALS

Figure 1:
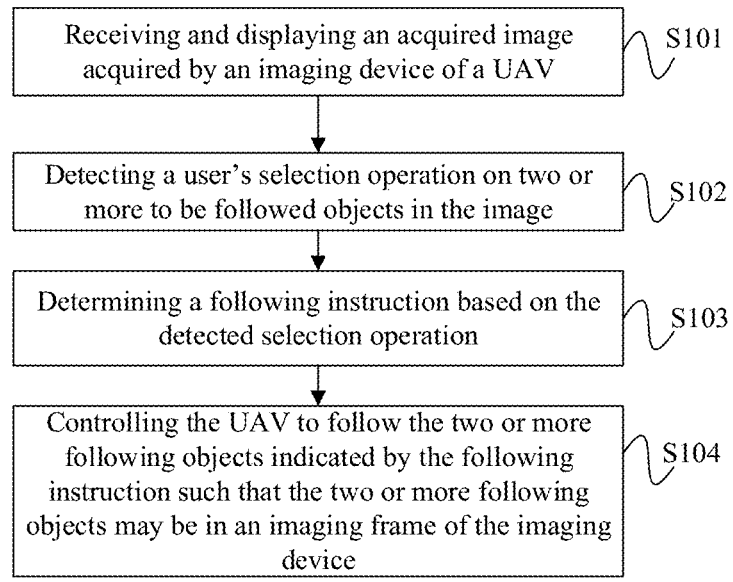
FIG. 1 is a flowchart of a following control method according to an embodiment of the present disclosure.

21 UAV
22 Imaging device
23 Processor
24 Communication interface
25 Control terminal
26 Gimbal
30 Interactive interface
31 Following object
32 Following object
33 Following object
34 Following object
35 Circular icon
36 Circular icon
37 Following object
38 Icon
39 Icon
40 Confirm follow icon
41 Icon
110 Composition selection icon
111 List 190 Control terminal
191 Communication interface
192 Processor
200 UAV
201 Imaging device
202 Processor
203 Communication interface
204 Gimbal
206 Propeller
207 Motor
210 Control terminal
211 Communication interface
212 Processor
217 Electronic speed controller

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

It should be noted that, when a component is referred to as being "fixed to" another component, the component can be directly fixed to the other component or an intermediate component may exist. When a component is regarded to be "connected" to another component, the component can be directly connected to the other component or an intermediate component may exist.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Exemplary embodiments will be described with reference to the accompanying drawings. Unless a conflict exists, the embodiments and features of the embodiments can be combined.

An embodiment of the present disclosure provides a following control method. FIG. 1 is a flowchart of a following control method according to an embodiment of the present disclosure. The following control method provided in the present embodiment can be applied to a control terminal of a UAV. The following control method will be described in detail below.

S101, receiving and displaying an image acquired by an imaging device of a UAV.

Figure 2:
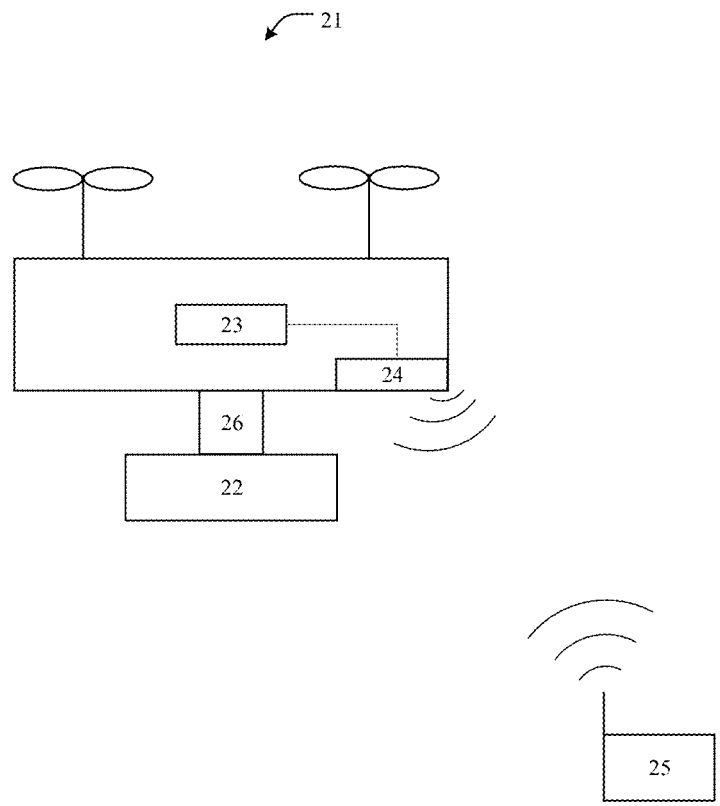
FIG. 2 is a diagram of a communication system according to an embodiment of the present disclosure.

As shown in FIG. 2, an imaging device 22 can be carried by a UAV 21. A processor 23 in the UAV 23 can acquire an image acquired by the imaging device 22. In some embodiments, the processor 23 may be a flight controller of the UAV 21, or another general-purpose or special-purpose processor. After the processor 23 acquires the image acquired by the imaging device 22, the processor 23 can send the image to a control terminal 25 of the UAV 21 through a communication interface 24 of the UAV 21. The UAV 21 and the control terminal 25 can communicate by wire or wirelessly. The present embodiment is described using wireless communication as an example. In addition, the imaging device 22 can be mounted on the UAV 21 through a gimbal 26.

Figure 3:
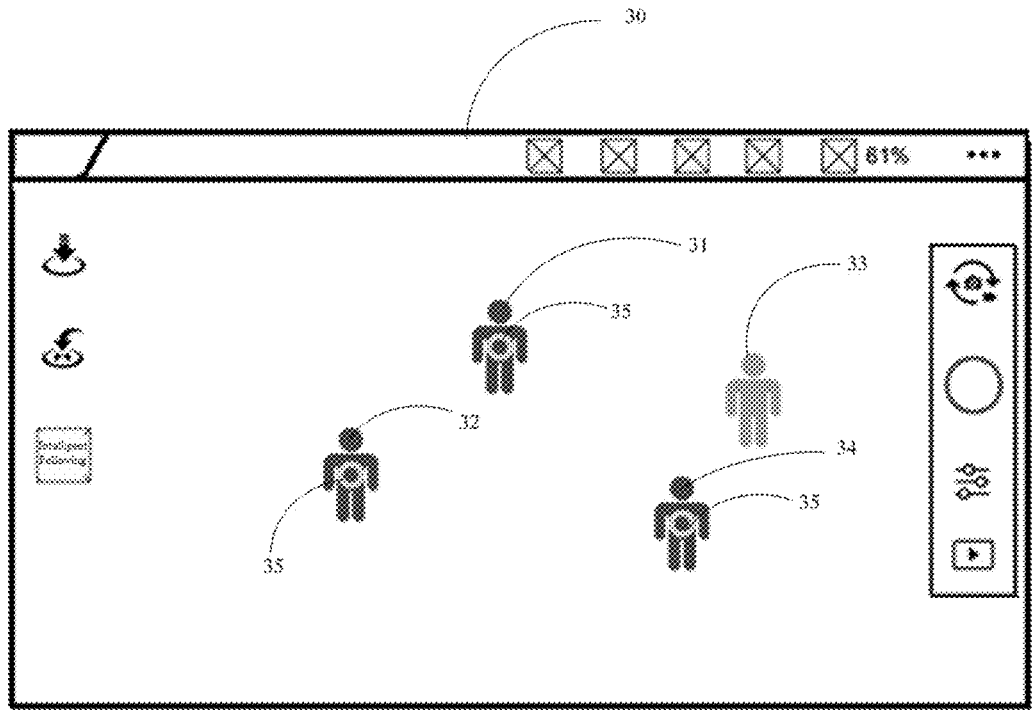
FIG. 3 is a diagram of an interactive interface according to an embodiment of the present disclosure.

The control terminal 25 may be a remote controller for controller the UAV 21, or a smartphone, a tablet computer, a ground control station, a laptop computer, etc., and combinations thereof. In some embodiments, the control terminal 25 may include a display device, such as a display screen, or the control terminal 25 may be connected to an external display device. After receiving the image sent by the UAV 21, the control terminal 25 may display the image on the display device. More specifically, the control terminal 25 may display the image on an interactive interface, which may be displayed on the display screen of the control terminal 25. In some embodiments, the display screen may be a touch screen. As shown in FIG. 3, the display on an interactive interface 30 is controlled by the control terminal 25. The image displayed by the interactive interface 30 includes a plurality of followed objects, such as following object 31, following object 32, following object 33, and following object 34. The number and types of followed objects used here are for description purpose, the present disclosure does not limit the number and types of followed objects.

S102, detecting a user's selection operation on two or more to be followed objects in the image. The user's selection operation of the two or more followed objects may be implemented by a voice selection operation, or by the operation of selecting the two or more followed objects on the interactive interface 30. The control terminal 25 may detect the user's selection operation on the two or more followed objects.

More specifically, detecting the user's selection operation on two or more to be followed objects in the image may include the following implementation methods.

In one implementation method, detecting the user's selection operation on two or more to be followed objects in the image may include detecting a user's voice selection operation on two or more to be followed objects in the image.

For example, the follow object 31 displayed on the interactive interface 30 may be wearing red clothes, and the follow object 32 may be wearing yellow clothes. The user may issue a voice selection operation of "following the objects in red clothes and yellow clothes" to the control terminal 25. The control terminal 25 may detect the user's voice selection operation on the following object 31 and the following object 32.

Alternatively, as shown in FIG. 3, the following object 32 is located in the lower left corner of the interactive interface 30, and the following object 34 is located in the lower right corner of the interactive interface 30. The user may issue a voice selection operation of "followed objects in the lower right corner and the lower left corner" to the control terminal. The control terminal 25 may detect the user's voice selection operation on the following object 33 and the following object 34.

In another implementation method, detecting the user's selection operation on two or more to be followed objects in the image may include detecting a user's selection operation of two or more followed objects on the interactive interface displaying the image.

As shown in FIG. 3, the user may perform a selection operation on two or more to be followed objects such as the following object 31 and the following object 32 among the plurality of followed objects displayed on the interactive interface 30. The control terminal 25 may detect a user's selection operation on the interactive interface 30 for two or more following object, such as the following object 31 and the following object 32. The selection operation may include, but is not limited to, a single-click, a double-click, a frame selection, press and hold, etc.

S103, determining a following instruction based on the detected selection operation.

In some embodiments, determining the following instruction based on the detected selection operation may include determining the following instruction based on the detected voice selection operation.

For example, the user may issue a voice selection operation of "following the objects in red clothes and yellow clothes" to the control terminal 25. The control terminal 25 may determine a following instruction based on the voice selection operation. The following includes may include characteristic information of the following object selected by the user, such as red clothes and yellow clothes. The control terminal 25 may send the following instruction to the UAV 21. The processor 23 of the UAV 21 may identify the following object 31 wearing red clothes and the following object 32 wearing yellow clothes from the image acquired by the imaging device 22 based on the characteristic information included in the following instruction, and the following object 31 and the following object 32 may be followed.

In another example, the user may issue a voice selection operation of "followed objects in the lower right corner and the lower left corner" to the control terminal 25. The control terminal 25 may determine a following instruction based on the voice selection operation. The following includes may include characteristic information of the following object selected by the user, such as the lower left corner and the lower right corner. The control terminal 25 may send the following instruction to the UAV 21. The processor 23 of the UAV 21 may identify the following object 33 in the lower left corner and the following object 34 in the lower right corner from the image acquired by the imaging device 22 based on the characteristic information included in the following instruction, and the following object 33 and the following object 34 may be followed.

In some embodiments, when the control terminal 25 detects a voice selection operation of "following the objects in red clothes and yellow clothes" and "followed objects in the lower right corner and the lower left corner" issued by a user. The control terminal 25 may identify characteristic information of two or more followed objects selected by the user, such as red clothes and yellow clothes, and determine position information of two or more followed objects in the image based on the characteristic information of the two or more followed objects, and generate a following instruction based on the position information of the two or more followed objects in the image. For example, the following instruction may include the position information of the two or more followed objects in the image.

In other embodiments, if the control terminal 25 detects a user's selection operation of two or more followed objects such as the following object 31 and the following object 32 on the interactive interface 30 using a touch operation, such as a single-click, a double-click, a frame selection, and press and hold, on a touch screen, the control terminal 25 may generated a following instruction based on the user's selection operation, and the following instruction may include position information of two or more followed objects selected by the user in the image.

S104, controlling the UAV to follow the two or more followed objects indicated by the following instruction such that the two or more followed objects may be in an imaging frame of the imaging device.

After the control terminal 25 determines the following instruction in any of the methods described above, the UAV 21 may be controlled to follow the two or more followed objects indicated by the following instruction, such as following the following object 31 and the following object 32. When the UAV is in the process of following the following object 31 and the following object 32, the processor 23 may adjust one or more of the movement direction of the UAV 21, the attitude of the UAV 21, or the attitude of the gimbal of the UAV 21 based on information such as the movement directions of the following object 31 and the following object 32 and the position of the following object 31 and the following object 32. As such, the following object 31 and the following object 32 may be kept in the imaging frame of the imaging device.

In addition, the present embodiment does not limit the following method of the two or more objects followed by the UAV 21. In some embodiments, the UAV 21 can follow behind the two or more followed objects, or follow in parallel with the two or more followed objects. Alternatively, the position of the UAV may be unchanged, and the UAV 21 may adjust the body attitude and/or the gimbal attitude such as the two or more followed objects may be in the imaging frame of the imaging device.

In the present embodiment, a control terminal may receive and display an image acquired by an imaging device of a UAV, detect a user's selection operation of two or more followed objects in the image, and determine a following instruction based on the detected selection operation. The following instruction may indicate two or more followed objects such that the UAV may follow the two or more followed objects. As such, the two or more followed objects may be in the imaging frame of the imaging device, such that the UAV may be applied to more imaging scenes, such as a group photo, or ball games or games involving multiple players.

Figure 4:
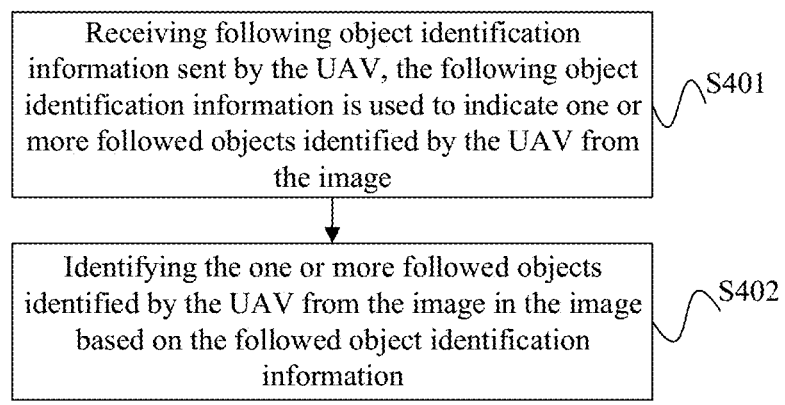
FIG. 4 is a flowchart of the following control method according to another embodiment of the present disclosure.

An embodiment of the present disclosure provides a following control method. FIG. 4 is a flowchart of the following control method according to another embodiment of the present disclosure. As shown in FIG. 4, based on the embodiment shown in FIG. 1, the control method of the present embodiment will be described in detail below.

S401, receiving following object identification information sent by the UAV, the following object identification information may be used to indicate one or more followed objects identified by the UAV from the image.

In the present embodiment, after the processor 23 of the UAV 21 acquires the imaging frame acquired by the imaging device 22, the processor 23 may further identify the followed objects in the image. For example, the processor 23 may use a neural network model to identify one or more pieces of information such as the outline, size, and type of an object in the image, and the distance between the object and the UAV. The processor 23 may determine whether the object can be a following object based on the sharpness of the outline, the size, or the type of the object. For example, the type of object identified by the neural network model may include people, animals, vehicles, etc., and the processor 23 may use the people identified by the neural network model as the following object. In addition, the processor 23 may also take an object whose distance from the UAV may be within a predetermined distance range as the following object. The description provided above is for illustrative purpose, and the specific method of the processor 23 identifying the following object is not limited in the embodiments of the present disclosure.

More specifically, when the processor 23 identifies the following object, the processor can send the identification information of the following object to the control terminal 25 of the UAV 21 through the communication interface 24 of the UAV. The following object identification information may be used to indicate one or more followed objects identified by the UAV 21 from the image. The one or more followed objects identified by the UAV 21 from the image may include a plurality of followed objects identified by the UAV 21 from the image. As shown in FIG. 3, the following object 31, the following object 32, and the following object 34 are followed objects identified by the UAV 21 from the image. The UAV may send the identification information of the following object 31, the following object 32, and the following object 34 to the control terminal 25.

S402, identifying, in the image, the one or more followed objects identified by the UAV from the image based on the following object identification information.

After the control terminal 25 receives the identification information of the followed objects 31, 32, and 34 sent by the UAV 21, the followed objects 31, 32, and 34 may be identified in the interactive interface 30. As such, the user can be aware of at least the objects in the image that the UAV can follow by observing the image.

More specifically, the following object identification information may include position information of the one or more followed objects identified by the UAV from the image.

For example, the identification information of the followed objects 31, 32, and 34 sent by the UAV 21 to the control terminal 25 may include the position information of the followed objects 31, 32, and 34 in the image.

In some embodiments, identifying, in the image, the one or more followed objects identified by the UAV from the image based on the following object identification information may include displaying an icon for identifying the one or more followed objects identified by the UAV from the image based on the following object identification information.

As shown in FIG. 3, the control terminal 25 may display an icon for identifying the following object 31, such as a circular icon 35 in the following object 31, in the image based on the position information of the following object 31 in the image. Similarly, the control terminal 25 may display an icon for identifying the following object 32, such as a circular icon 35 in the following object 32, in the image based on the position information of the following object 32 in the image. Further, the control terminal 25 may display an icon for identifying the following object 34, such as a circular icon 35 in the following object 34, in the image based on the position information of the following object 34 in the image. The description provided above is for illustrative purpose. In other embodiments, other icons besides the circular icon may be used to identify the followed objects identified by the UAV.

More specifically, detecting the user's selection operation of two or more followed objects in the image may include the following implementation methods.

In one implementation method, the one or more followed objects identified by the UAV from the image may include a plurality of followed objects identified by the UAV from the image. Further, detecting the user's selection operation of two or more followed objects in the image may include detecting the user's selection operation of two or more followed objects identified by the UAV from the image.

As shown in FIG. 3, the followed objects 31, 32, and 34 are the followed objects identified by the UAV 21 from the image, and the user may select two or more of followed objects 31, 32, or 34 on the interactive interface 30. For example, the user may single-click, double-click, select a frame, and press and hold on two or more of the followed objects 31, 32, or 34. Alternatively, the user may also single-click, double-click, select a frame, and press and hold the circular icons 35 in two or more of the followed objects 31, 32, or 34. The control terminal 25 may detect the user's selection operation of two or more followed objects identified by the UAV from the image.

Figure 5:
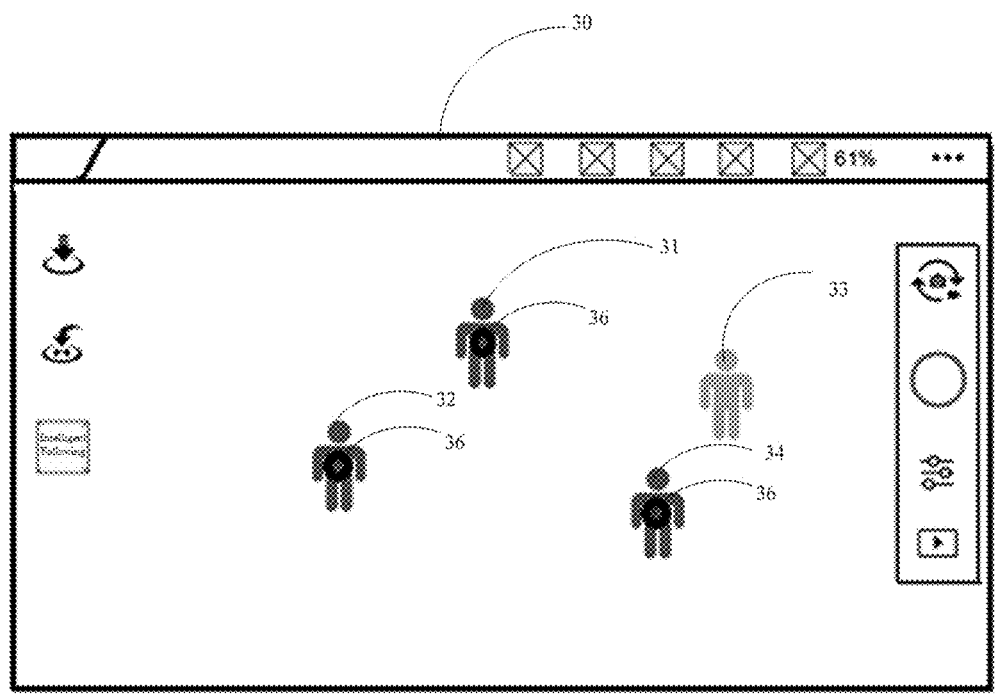
FIG. 5 is a diagram of the interactive interface according to another embodiment of the present disclosure.

For example, the user may perform single-clicks on the followed objects 31, 32, and 34. When the control terminal 25 detects that the user performed single-clicks on the followed objects 31, 32, and 34, the shape and/or color of the circular icons 35 may be updated on the interactive interface 30. The present embodiment uses a color update as example for the following description. As shown in FIG. 5, after the user performs single-clicks on the followed objects 31, 32, and 34, the circular icons 35 are updated to the circular icons 36, and the color of the circular icons 35 are different from the color of the circular icons 36. That is, the circular icon 35 may indicate that the following object is in a candidate state, and the circular icon 36 may indicate that the following object is in a selected state.

In another implementation method, detecting the user's selection operation of two or more followed objects in the image may include detecting the user's selection operation of two or more followed objects in the image that are not identified by the UAV from the image.

Figure 6:
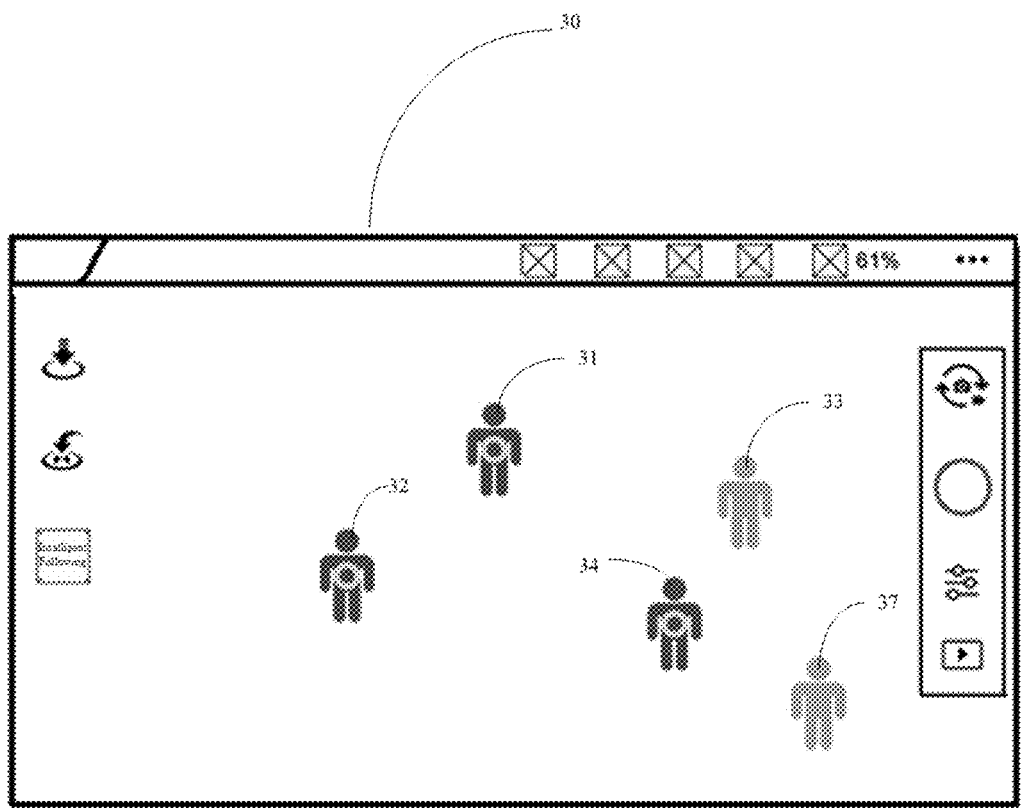
FIG. 6 is a diagram of the interactive interface according to yet another embodiment of the present disclosure.

As shown in FIG. 6, followed objects 31, 32, and 34 are the followed objects identified by the UAV 21 from the image, and the followed objects 33 and 37 are the followed objects not identified by the UAV 21 from the image. The user may also select two or more followed objects that are not identified by the UAV 21 in the image, and the selection method may include single-click, double-click, select a frame, press and hold, etc. The control terminal 25 may also detect the user's selection operation of two or more followed objects in the image that are not identified by the UAV from the image.

Figure 7:
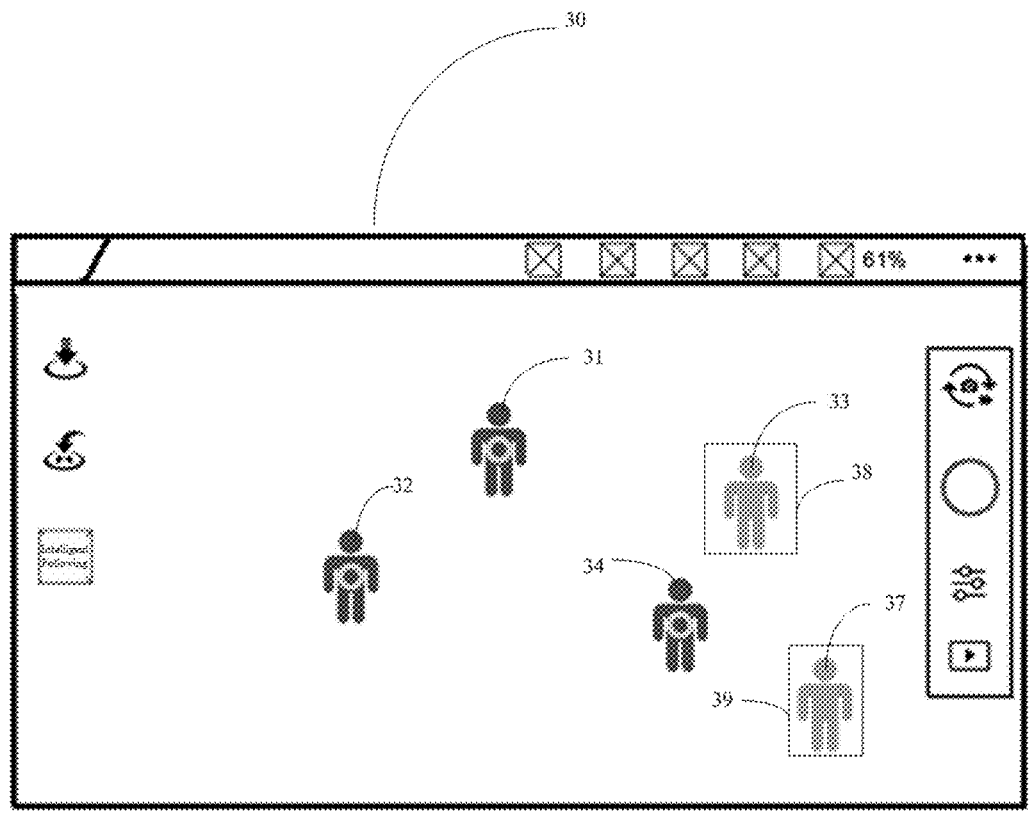
FIG. 7 is a diagram of the interactive interface according to still another embodiment of the present disclosure.

For example, the user may select the followed objects 33 and 37 using a frame. When the control terminal 25 detects that the user has selected the followed objects 33 and 37, the interactive interface 30 may display an icon for selecting the following object 33 and an icon for selecting the following object 37. As shown in FIG. 7, an icon 38 may indicate an icon for framing the following object 33, and an icon 39 may indicate an icon for framing the following object 37.

In yet another implementation method, detecting the user's selection operation of two or more followed objects in the image may include detecting the user's selection operation of two or more followed objects identified by the UAV from the image, and the selection operation of one or more followed objects not identified by the UAV from the image.

Figure 8:
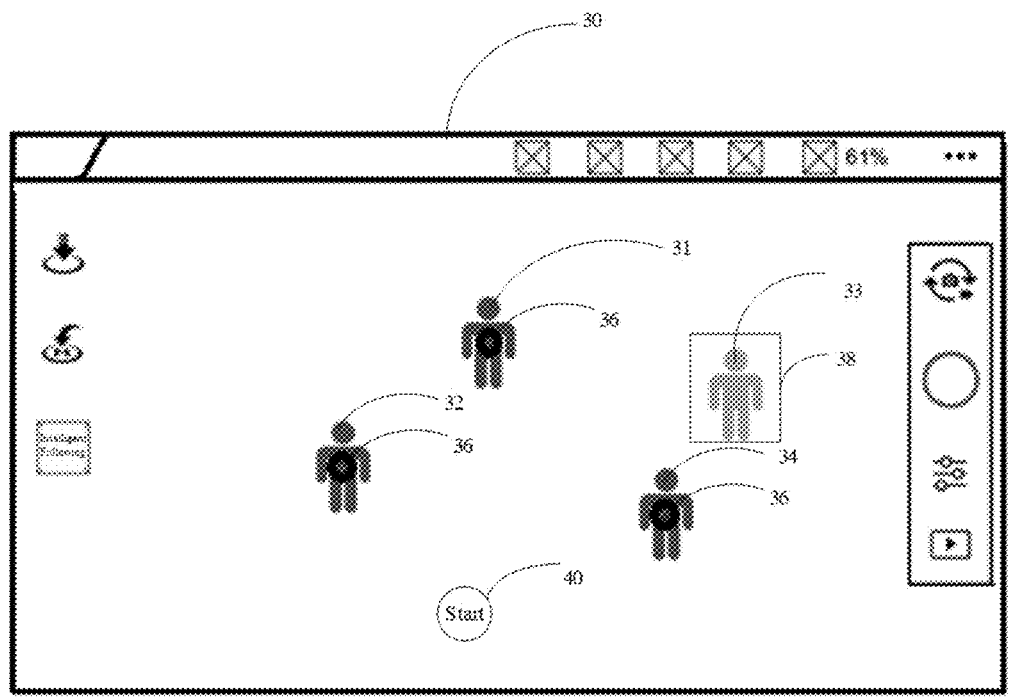
FIG. 8 is a diagram of the interactive interface according to yet another embodiment of the present disclosure.

As shown in FIG. 8, the user may also select one or more followed objects identified by the UAV 21 in the image, such as the followed objects 31, 32, and 34, and one or more followed objects not identified by eh UAV 21 in the image, such as the following object 33. The control terminal 25 may detect the user's selection operation on the followed objects 31, 32, and 34, and the user's selection operation on the following object 33.

In other embodiments, the control method may further include receiving type information of the one or more followed objects sent by the UAV; and identifying the type of the one or more followed objects in the image based on the type information of the one or more followed objects.

For example, the processor 23 in the UAV 21 may use a neural network model to identify the type of the following object in the image. In some embodiments, the type of the following object may be a person, an animal, or a vehicle. The processor 23 may further send the type information of the following object identified by the UAV 21 to the control terminal 25 of the UAV 21 through the communication interface 24 of the UAV 21. The control terminal 25 may also identified the type of the one or more followed objects identified by the UAV 21 in the interactive interface 30. For example, the type information may be displayed around the followed objects 31, 32, and 34, respectively.

In the present embodiment, the control terminal may receive the following object identification information sent by the UAV, and identify, in the image, one or more followed objects identified by the UAV from the image based on the following object identification information. As such, the user may be aware of at least the objects in the image that the UAV can follow, thereby improving the user experience.

Figure 9:
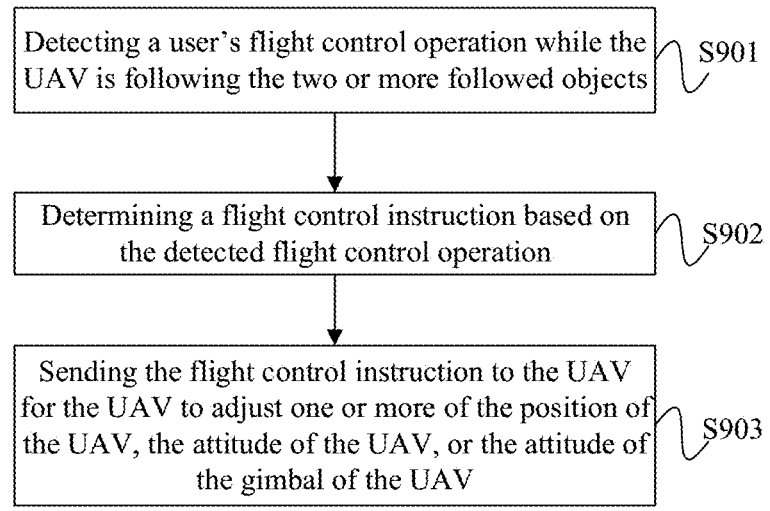
FIG. 9 is a flowchart of the following control method according to yet another embodiment of the present disclosure.

An embodiment of the present disclosure provides a following control method. FIG. 9 is a flowchart of the following control method according to yet another embodiment of the present disclosure. Based on the previous embodiments, the following control method may further include detecting the user's confirm follow operation. Further, controlling the UAV to follow the two or more followed objects indicated by the following instruction such that the two or more followed objects may be in the imaging frame of the imaging device may include controlling the UAV to follow the two or more followed objects indicated by the following instruction such that the two or more followed objects may be in the imaging frame of the imaging device after detecting the user's confirm follow operation.

In some embodiments, the method may further include displaying an icon to confirm follow, and detecting the user's confirm follow operation may include detecting the user's operation on the confirm follow icon.

As shown in FIG. 8, after the user selects the followed objects 31, 32, 33, and 34, the control terminal 25 may further display a confirm follow icon 40 on the interactive interface 30. When the user clicks the confirm follow icon 40, it may indicate that the UAV 21 is controlled the start following the followed objects 31, 32, 33, and 34. More specifically, after the control terminal 25 detects a user operation such as clicking on the confirm follow icon 40, the control terminal 25 may control the UAV 21 to follow the followed objects 31, 32, 33, and 34. In the process of the UAV 21 following the followed objects 31 and 32, the processor 23 may adjust one or more of the movement direction of the UAV 21, the attitude of the UAV 21, or the attitude of the gimbal of the UAV 21 based on information such as the movement directions of the followed objects 31, 32, 33, and 34, and the position of each following object in the image. As such, the followed objects 31, 32, 33, and 34 may be kept in the imaging frame of the imaging device.

Figure 10:
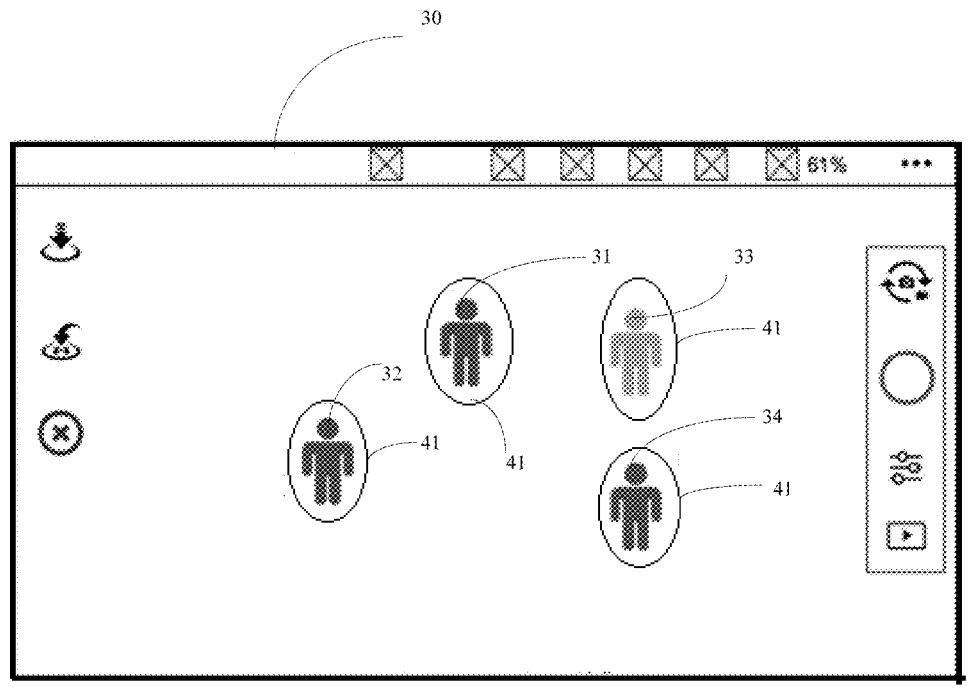
FIG. 10 is a diagram of the interactive interface according to another embodiment of the present disclosure.

As shown in FIG. 10, after the user clicks the confirm follow icon 40, the control terminal 25 may also update the circular icons 36 and the icon 38 in the interactive interface 30. For example, icons 41 are updated as shown in FIG. 10. That is, icons 41 may indicate that the followed objects are in the followed state. In the present embodiment, the color and shape of the icons 41 are not limited in the present embodiment.

In addition, the control terminal 25 may also detect an end-follow operation by the user and generate an end-follow instruction based on the end-follow operation. As such, the UAV 21 may be controlled to stop following the two or more followed objects selected by the user, such as the followed objects 31, 32, 33, and 34. When the UAV 21 finishes following, the UAV 21 may re-identify the followed objects in the imaging frame of the imaging device 22, and send the following object identification information of the identified followed objects to the control terminal 25. The control terminal 25 may identify the followed objects re-identified by the UAV on the interactive interface 30 using the identification method shown in FIG. 3, and details will not be described herein again. The present embodiment does not limit the user's end-follow operation. More specifically, the user may click an exit button on the interactive interface 30, and may also issue a voice control on the control terminal 25. For example, the user may say "end follow" to the control terminal 25.

In some embodiments, the method may further include the embodiment shown in FIG. 9.

S901, detecting a user's flight control operation while the UAV is following the two or more followed objects.

As shown in FIG. 8, when the UAV 21 is following the followed objects 31, 32, 33, and 34, the user may also operate the control buttons in the interactive interface 30. For example, the interactive interface 30 may also display the buttons for controlling the position of the UAV 21, the attitude of the UAV 21, or the attitude of the gimbal.

S902, determining a flight control instruction based on the detected flight control operation.

When the control terminal 25 detects a user's operation of a button for controlling the position of the UAV 21, the attitude of the UAV 21, or the attitude of the gimbal, a flight control instruction may be generated.

S903, sending the flight control instruction to the UAV such that the UAV may adjust one or more of the position of the UAV, the attitude of the UAV, or the attitude of the gimbal of the UAV.

When the control terminal 25 generates the flight control instruction, the control terminal 25 may send the flight control instruction to the UAV 21 such that the UAV 21 may adjust one or more of position of the UAV, the attitude of the UAV, or the attitude of the gimbal of the UAV based on the flight control instruction.

For example, when the UAV is following the two or more followed objects indicated by the following instruction, the UAV may adjust one or more of the movement direction of the UAV, the attitude of the UAV, or the attitude of the gimbal of the UAV based on information such as the movement direction and position of the two or more followed objects such that the two or more followed objects may be kept in the imaging frame.

While the UAV is following the two or more followed objects, the UAV may also receive the flight control instruction from the control terminal, and the UAV may adjust one or more of the position of the UAV, the attitude of the UAV, or the attitude of the gimbal of the UAV based on the flight control instruction. For example, before the UAV receives the flight control instruction sent by the control terminal, the UAV may follow the two or more followed objects behind the two or more followed objects, and the flight control instruction may be used to control the UAV to follow the two or more followed objects on the side of the two or more followed objects. As such, after the UAV receives the flight control instruction sent by the control terminal, the UAV may adjust the following method, that is, follow the two or more followed objects on the side of the two or more followed objects.

In some embodiments, the method may further include detecting a user's composition selection operation; and determining a composition instruction based on the detection composition selection operation. Further, controlling the UAV to follow the two of more followed objects indicated by the following instruction such that the two or more followed objects may be in the imaging frame of the imaging device may include controlling the UAV to follow the two of more followed objects indicated by the following instruction such that the two or more followed objects may be in the imaging frame of the imaging device based on a composition rule indicated by the composition instruction.

Figure 11:
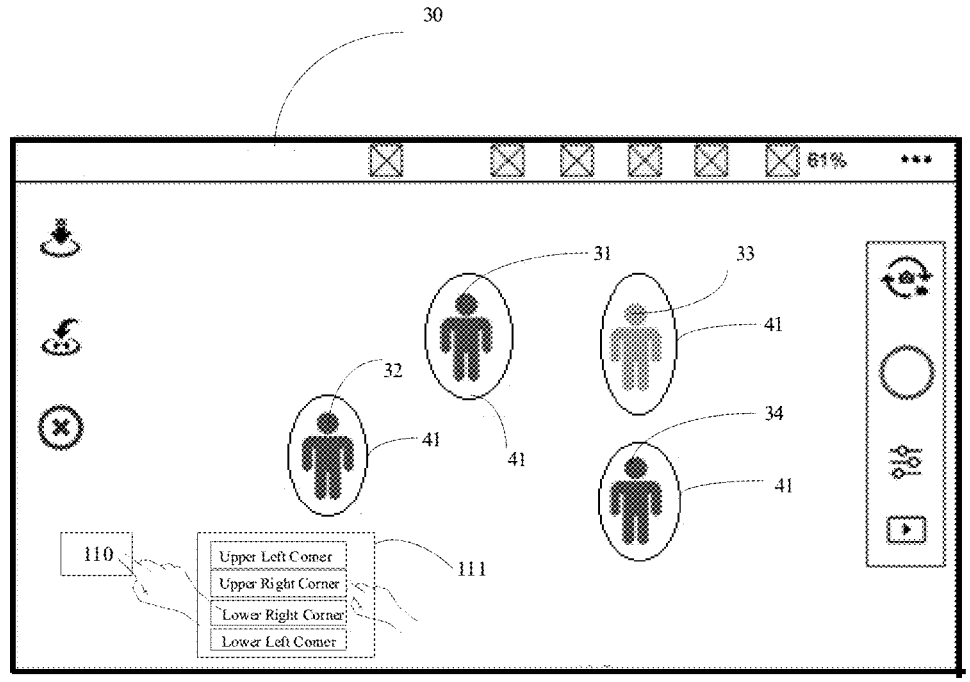
FIG. 11 is a diagram of the interactive interface according to yet another embodiment of the present disclosure.

In the present embodiment, the control terminal 25 may also control the UAV 21 to follow two or more followed objects such that the two or more followed objects may be located at a predetermined position in the imaging frame of the imaging device. As shown in FIG. 11, the interactive interface 30 further display a composition selection icon 110. When the user clicks the composition selection icon 110, the interactive interface 30 displays a list 111, and the list 111 includes four selectable options such as an upper left corner, a lower left corner, an upper right corner, and a lower right corner. The upper left corner, the lower left corner, the upper right corner, and the lower right corner respectively indicate positions of two or more followed objects that the UAV may be controlled to follow in the imaging frame. When the user performs any of the four selectable options, the control terminal 25 may generate a corresponding composition instruction. For example, when the user selects the upper right corner, the composition rule indicated by the composition instruction generated by the control terminal 25 may cause the two or more followed objects followed by the UAV to be located in the upper right corner of the imaging frame of the imaging device. Similarly, when the user selects the upper left corner, the composition rule indicated by the composition instruction generated by the control terminal 25 may cause the two or more followed objects followed by the UAV to be located in the upper left corner of the imaging frame of the imaging device, and so on.

Taking the user's selection of the upper right corner as an example for description purpose. After the control terminal 25 determines the following instruction, the UAV 21 may be controlled to follow the two or more followed objects indicated by the following instruction, such as the followed objects 31 and 32. While the UAV 21 is following the followed objects 31 and 32, the processor 23 may adjust the movement direction of the UAV 21, the attitude of the UAV 21, and attitude of the gimbal of the UAV 21 based on information such as the movement directions of the followed objects 31 and 32, and the position of the followed objects 31 and 32 in the image, such that the followed objects 31 and 32 may be located at the upper right corner of the imaging frame of the imaging device 22.

In the present embodiment, the control terminal may detect a user's composition selection operation, and a composition instruction may be determined based on the detected composition selection operation. When the UAV is controlled to follow the two or more followed objects indicated by the following instruction, the two or more followed objects may be located in the imaging frame of the imaging device based on the composition rule indicated by the composition instruction, thereby improving the flexibility of the UAV to follow two or more followed objects.

Figure 12:
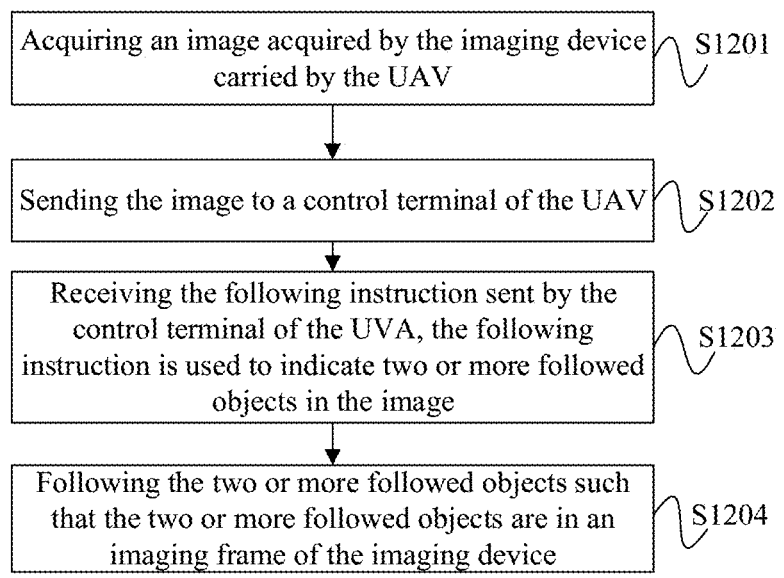
FIG. 12 is a flowchart of the following control method according to another embodiment of the present disclosure.

An embodiment of the present disclosure provides a following control method. FIG. 12 is a flowchart of the following control method according to another embodiment of the present disclosure. The following control method provided in the present embodiment can be applied to a UAV. The following control method is described in detail below.

S1201, acquiring an image acquired by the imaging device carried by the UAV.

As shown in FIG. 2, an imaging device 22 can be carried by a UAV 21. A processor 23 in the UAV 23 can acquire an image acquired by the imaging device 22. In some embodiments, the processor 23 may be a flight controller of the UAV 21, or another general-purpose or special-purpose processor. The processor 23 may be configured to acquire the image acquired by the imaging device 22.

S1202, sending the image to a control terminal of the UAV.

After the processor 23 acquires the image acquired by the imaging device 22, the processor 23 can send the image to a control terminal 25 of the UAV 21 through a communication interface 24 of the UAV 21. The UAV 21 and the control terminal 25 can communicate by wire or wirelessly. The present embodiment is described using wireless communication as an example.

The control terminal 25 may receive and display the image, detect a user's selection operation of two or more followed objects in the image, and determine a following instruction based on the detected selection operation. The specific principles and implementation methods are consistent with the foregoing embodiments, and are not repeated here.

S1203, receiving the following instruction sent by the control terminal of the UAV, the following instruction may be used to indicate two or more followed objects in the image.

When the control terminal 25 determines the following instruction by using the methods described in the previous embodiments, the following instruction may be sent to the UAV 21, and the following instruction may be used to indicate the two or more followed objects selected by the user.

S1204, following the two or more followed objects such that the two or more followed objects may be in an imaging frame of the imaging device.

The UAV 21 may follow the two or more followed objects indicated by the following instruction, such as follow the followed objects 31 and 32. While the UAV 21 is following the followed objects 31 and 32, the processor 23 may adjust one or more of the position of the UAV, the attitude of the UAV, or the attitude of the gimbal of the UAV based on information such as the movement directions of the followed objects 31 and 32, and the positions of the followed objects 31 and 32 in the image, such that the followed objects 31 and 32 may be in the imaging frame of the imaging device 22.

In the present embodiment, the UAV may acquire an image acquired by the imaging device carried by the UAV, the image may be sent to the control terminal of the UAV, and two or more followed objects indicated by the following instruction based on the following instruction based sent by the control terminal. As such, the two or more followed objects may be in the imaging frame of the imaging device, such that the UAV may be applied to more imaging scenes, such as a group photo, or ball games or games involving multiple players.

Figure 13:
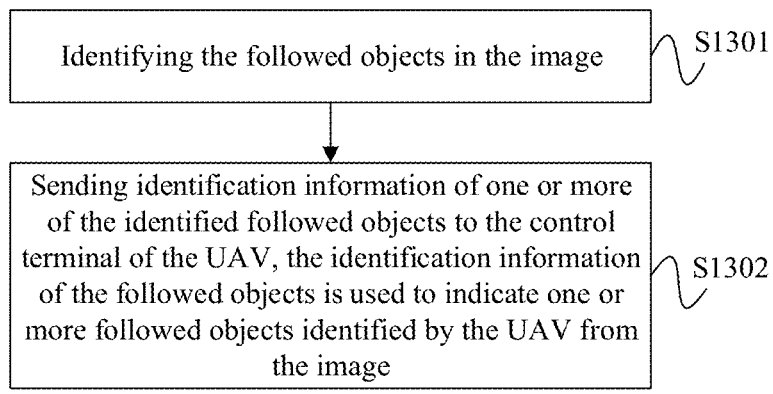
FIG. 13 is a flowchart of the following control method according to yet another embodiment of the present disclosure.

An embodiment of the present disclosure provides a following control method. FIG. 13 is a flowchart of the following control method according to yet another embodiment of the present disclosure. The following control method provided in the present embodiment can be applied to a UAV. The following control method is described in detail below.

S1301, identifying the followed objects in the image.

In the present embodiment, after the processor 23 of the UAV 21 acquires the imaging frame acquired by the imaging device 22, the processor 23 may further identify the followed objects in the image. For example, the processor 23 may use a neural network model to identify one or more pieces of information such as the outline, size, and type of an object in the image, and the distance between the object and the UAV. The processor 23 may determine whether the object can be a following object based on the sharpness of the outline, the size, or the type of the object. For example, the type of object identified by the neural network model may include people, animals, vehicles, etc., and the processor 23 may use the people identified by the neural network model as the following object. In addition, the processor 23 may also take an object whose distance from the UAV may be within a predetermined distance range as the following object. The description provided above is for illustrative purpose, and the specific method of the processor 23 identifying the following object is not limited in the embodiments of the present disclosure.

1302, sending identification information of one or more of the identified followed objects to the control terminal of the UAV, the identification information of the followed objects may be used to indicate one or more followed objects identified by the UAV from the image.

More specifically, when the processor 23 identifies the following object, the processor can send the identification information of the following object to the control terminal 25 of the UAV 21 through the communication interface 24 of the UAV. The following object identification information may be used to indicate one or more followed objects identified by the UAV 21 from the image. The one or more followed objects identified by the UAV 21 from the image may include a plurality of followed objects identified by the UAV 21 from the image. As shown in FIG. 3, the following object 31, the following object 32, and the following object 34 are followed objects identified by the UAV 21 from the image. The UAV may send the identification information of the following object 31, the following object 32, and the following object 34 to the control terminal 25.

More specifically, the following object identification information may include position information of the one or more followed objects identified by the UAV from the image.

For example, the identification information of the followed objects 31, 32, and 34 sent by the UAV 21 to the control terminal 25 may include the position information of the followed objects 31, 32, and 34 in the image.

Figure 14:
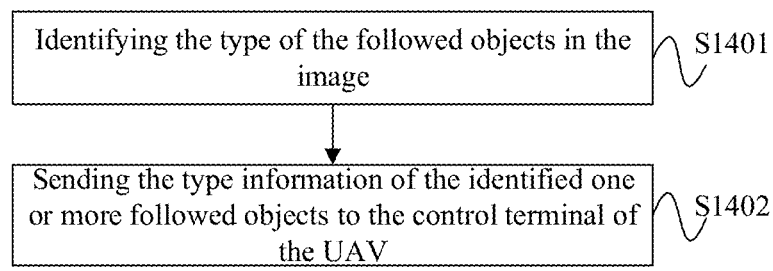
FIG. 14 is a flowchart of the following control method according to still another embodiment of the present disclosure.

In addition, based on the embodiment shown in FIG. 12 or FIG. 13, the method may further include the embodiment shown in FIG. 14.

S1401, identifying the type of the followed objects in the image.

For example, the processor 23 in the UAV 21 may use a neural network model to identify the type of the following object in the image. In some embodiments, the type of the following object may be a person, an animal, or a vehicle.

S1402, sending the type information of the identified one or more followed objects to the control terminal of the UAV.

The processor 23 may further send the type information of the following object identified by the UAV 21 to the control terminal 25 of the UAV 21 through the communication interface 24 of the UAV 21. The control terminal 25 may also identified the type of the one or more followed objects identified by the UAV 21 in the interactive interface 30. For example, the type information may be displayed around the followed objects 31, 32, and 34, respectively.

In some embodiments, the following control method may further include receiving a flight control instruction sent by the control terminal of the UAV in the process of following the two or more followed objects; and adjusting one or more of the position of the UAV, the attitude of the UAV, or the attitude of the gimbal of the UAV based on the flight control instruction.

As shown in FIG. 8, when the UAV 21 is following the followed objects 31, 32, 33, and 34, the user may also operate the control buttons in the interactive interface 30. For example, the interactive interface 30 may also display the buttons for controlling the position of the UAV 21, the attitude of the UAV 21, or the attitude of the gimbal. When the control terminal 25 detects a user's operation on a button, the flight control instruction may be generated and sent to the UAV 21.

The UAV may receive the flight control instruction from the control terminal 25 when the UAV 21 is in the process of following the followed objects 31, 32, 33, and 34, and adjust one or more of the position of the UAV, the attitude of the UAV, or the attitude of the gimbal of the UAV based on the flight control instruction.

In some embodiments, the following control method may further include receiving a composition instruction sent by the control terminal of the UAV. Further, following the two or more followed objects such that the two or more followed objects may be in the imaging frame of the imaging device may include following the two or more followed objects such that the two or more followed objects may be in the imaging frame of the imaging device based on a composition rule indicated by the composition instruction.

In some embodiments, the UAV 21 may also receive the composition instruction sent by the control terminal 25. The specific principle and implementation method of the composition instruction are consistent with the above embodiments, and are not repeated here.

Taking the user's selection of the upper right corner as shown in FIG. 11 as an example for description purpose. When the UAV 21 receives the following instruction sent by the control terminal 25, the UAV 21 may follow the two or more followed objects indicated by the following instruction. When the UAV 21 is in the process of following the two or more followed objects, the processor 23 may adjust one or more of the movement direction of the UAV 21, the attitude of the UAV 21, or the attitude of the gimbal of the UAV 21 based on information such as the movement directions of the two or more followed objects, and the positions of the two or more followed objects in the image. As such, the two or more followed objects may be located at the upper right corner of the imaging frame of the imaging device.

In the present embodiment, the UAV may receive the composition instruction sent by the control terminal, and when following the two or more followed objects indicated by the following instruction, the two or more followed objects may be located in the imaging frame of the imaging device based on the composition rule indicated by the composition instruction, thereby improving the flexibility of the UAV to follow two or more followed objects.

Figure 15:
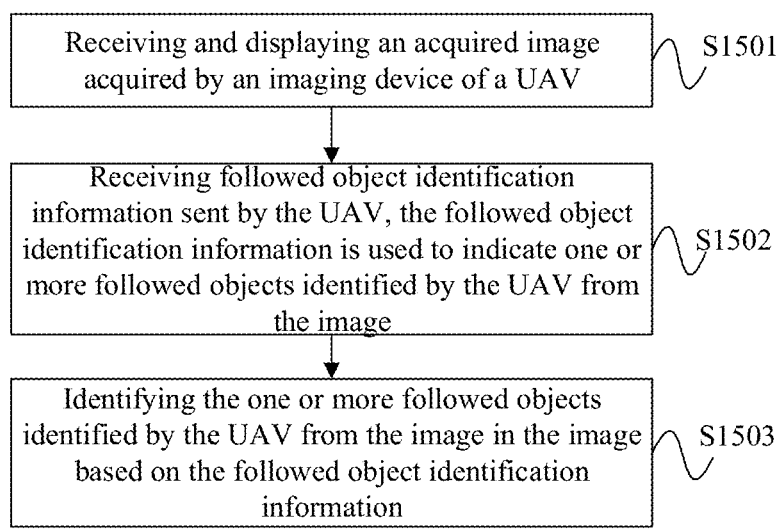
FIG. 15 is a flowchart of the following control method according to yet another embodiment of the present disclosure.

An embodiment of the present disclosure provides a following control method. FIG. 15 is a flowchart of the following control method according to yet another embodiment of the present disclosure. The following control method provided in the present embodiment can be applied to a UAV. The following control method is described in detail below.

S1501, receiving and displaying an acquired image acquired by an imaging device of a UAV.

The specific principles and implementation methods of S1501 and S101 are the same, and details are not described herein again.

S1502, receiving following object identification information sent by the UAV, the following object identification information may be used to indicate one or more followed objects identified by the UAV from the image.

The specific principles and implementation methods of S1502 and S401 are the same, and details are not described herein again.

S1503, identifying, in the image, the one or more followed objects identified by the UAV from the image based on the following object identification information.

The specific principles and implementation methods of S1503 and S402 are the same, and details are not described herein again.

More specifically, the following object identification information may include position information of the one or more followed objects identified by the UAV from the image.

For example, the identification information of the followed objects 31, 32, and 34 sent by the UAV 21 to the control terminal 25 may include the position information of the followed objects 31, 32, and 34 in the image.

In some embodiments, identifying the one or more followed objects identified by the UAV from the image based on the following object identification information may include displaying an icon for identifying the one or more followed objects identified by the UAV from the image based on the following object identification information.

As shown in FIG. 3, the control terminal 25 may display an icon for identifying the following object 31, such as a circular icon 35 in the following object 31, in the image based on the position information of the following object 31 in the image. Similarly, the control terminal 25 may display an icon for identifying the following object 32, such as a circular icon 35 in the following object 32, in the image based on the position information of the following object 32 in the image. Further, the control terminal 25 may display an icon for identifying the following object 34, such as a circular icon 35 in the following object 34, in the image based on the position information of the following object 34 in the image. The description provided above is for illustrative purpose. In other embodiments, other icons besides the circular icon may be used to identify the followed objects identified by the UAV.

In some embodiments, the method may further include receiving the type information of one or more of followed objects sent by the UAV; identifying the type of the one or more of followed objects in the image based on the type information of the one or more of followed objects.

For example, the processor 23 in the UAV 21 may use a neural network model to identify the type of the following object in the image. In some embodiments, the type of the following object may be a person, an animal, or a vehicle. The processor 23 may further send the type information of the following object identified by the UAV 21 to the control terminal 25 of the UAV 21 through the communication interface 24 of the UAV 21. The control terminal 25 may also identified the type of the one or more followed objects identified by the UAV 21 in the interactive interface 30, and the one or more followed objects may include at least two followed objects. For example, the control terminal 25 may display the type information around the followed objects 31, 32, and 34, respectively, in the interactive interface 30.

In the present embodiment, the control terminal may receive the following object identification information sent by the UAV, and identify one or more followed objects indicated by the followed objects identification information and identified by the UAV from the image based on the following object identification information. As such, the user can be aware of at least the objects in the image that the UAV can follow, thereby improving the user experience.

Figure 16:
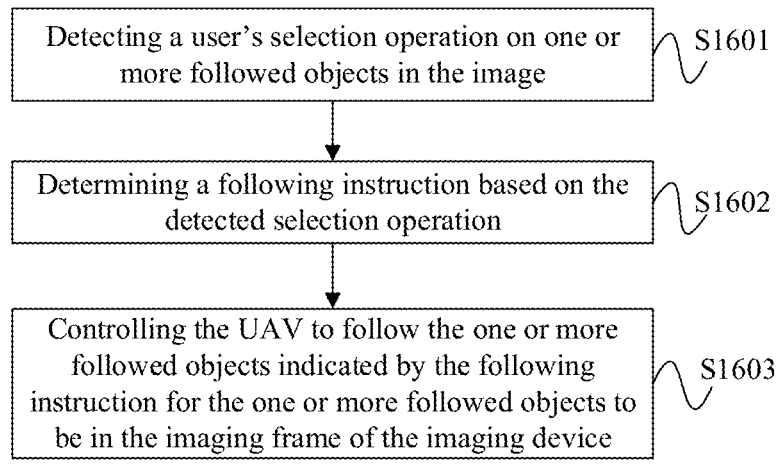
FIG. 16 is a flowchart of the following control method according to still another embodiment of the present disclosure.

An embodiment of the present disclosure provides a following control method. FIG. 16 is a flowchart of the following control method according to still another embodiment of the present disclosure. The following control method provided in the present embodiment can be applied to a control terminal of a UAV. The following control method is described in detail below.

S1601, detecting a user's selection operation on one or more followed objects in the image. In some embodiments, the one or more followed objects may include two or more followed objects.

As shown in FIG. 8, the interactive interface 30 of the control terminal 25 displays the followed objects 31, 32, 33, and 34. The user can select any one or more of the followed objects 31, 32, 33, or 34. For example, the user may frame select the following object 33 that is not identified by the UAV 21, or click to select one or more of the followed objects 31, 32, or 34 identified by the UAV 21. In some embodiments, the user may also select the followed objects not identified by the UAV and the followed objects identified by the UAV 21.

The specific principles and implementation methods of S1601 and S102 are the same, and details are not described herein again.

More specifically, detecting the user's selection operation on one or more followed objects in the image may include the following implementation methods.

In one implementation method, detecting the user's selection operation on one or more followed objects in the image may include detecting a user's voice selection operation on one or more followed objects in the image. In some embodiments, the one or more followed objects may include two or more followed objects.

The specific principles and implementation methods of detecting the user's voice selection operation for one or more followed objects in the image are consistent with the specific principles and implementation methods of detecting the user's voice selection operation for two or more followed objects in the image described in the previous embodiments, and are not repeated herein again.

In another implementation method, detecting the user's selection operation on one or more followed objects in the image may include detecting a user's selection operation of one or more followed objects on the interactive interface displaying the image. In some embodiments, the one or more followed objects may include two or more followed objects.

The specific principles and implementation methods of detecting the user's selection operation for one or more followed objects in the image are consistent with the specific principles and implementation methods of detecting the user's selection operation for two or more followed objects in the image described in the previous embodiments, and are not repeated herein again.

In yet another implementation method, detecting the user's selection operation on one or more followed objects in the image may include detecting the user's selection operation of one or more followed objects identified by the UAV from the image. In some embodiments, the one or more followed objects may include two or more followed objects.

As shown in FIG. 3, the followed objects 31, 32, and 34 are the followed objects identified by the UAV 21 from the image, and the user may select two or more of followed objects 31, 32, or 34 on the interactive interface 30. For example, the user may single-click, double-click, select a frame, and press and hold on two or more of the followed objects 31, 32, or 34.

In still another implementation method, detecting the user's selection operation on one or more followed objects in the image may include detecting the user's selection operation of one or more followed objects in the image that are not identified by the UAV from the image.

In some embodiments, the one or more followed objects may include two or more followed objects.

As shown in FIG. 6, followed objects 31, 32, and 34 are the followed objects identified by the UAV 21 from the image, and the followed objects 33 and 37 are the followed objects not identified by the UAV 21 from the image. The user may also select two or more followed objects that are not identified by the UAV 21 in the image, and the selection method may include single-click, double-click, select a frame, press and hold, etc. The control terminal 25 may also detect the user's selection operation of two or more followed objects in the image that are not identified by the UAV from the image.

As shown in FIG. 8, the user may also select one or more followed objects identified by the UAV 21 in the image, such as the followed objects 31, 32, and 34, and one or more followed objects not identified by eh UAV 21 in the image, such as the following object 33. The control terminal 25 may detect the user's selection operation on the followed objects 31, 32, and 34, and the user's selection operation on the following object 33.

S1602, determining a following instruction based on the detected selection operation.

More specifically, determining the following instruction based on the detected selection operation may include determining the following instruction based on the detected voice selection operation.

For example, the user may issue a voice selection operation of "following the objects in red clothes and yellow clothes" to the control terminal 25. The control terminal 25 may determine a following instruction based on the voice selection operation. The following includes may include characteristic information of the following object selected by the user, such as red clothes and yellow clothes. The control terminal 25 may send the following instruction to the UAV 21. The processor 23 of the UAV 21 may identify the following object 31 wearing red clothes and the following object 32 wearing yellow clothes from the image acquired by the imaging device 22 based on the characteristic information included in the following instruction, and the following object 31 and the following object 32 may be followed.

In another example, the user may issue a voice selection operation of "followed objects in the lower right corner and the lower left corner" to the control terminal 25. The control terminal 25 may determine a following instruction based on the voice selection operation. The following includes may include characteristic information of the following object selected by the user, such as the lower left corner and the lower right corner. The control terminal 25 may send the following instruction to the UAV 21. The processor 23 of the UAV 21 may identify the following object 33 in the lower left corner and the following object 34 in the lower right corner from the image acquired by the imaging device 22 based on the characteristic information included in the following instruction, and the following object 33 and the following object 34 may be followed.

In some embodiments, when the control terminal 25 detects a voice selection operation of "following the objects in red clothes and yellow clothes" and "followed objects in the lower right corner and the lower left corner" issued by a user. The control terminal 25 may identify characteristic information of two or more followed objects selected by the user, such as red clothes and yellow clothes, and determine position information of two or more followed objects in the image based on the characteristic information of the two or more followed objects, and generate a following instruction based on the position information of the two or more followed objects in the image. For example, the following instruction may include the position information of the two or more followed objects selected by the user in the image In other embodiments, if the control terminal 25 detects a user's selection operation of two or more followed objects such as the following object 31 and the following object 32 on the interactive interface 30 using a touch operation, such as a single-click, a double-click, a frame selection, and press and hold, on a touch screen, the control terminal 25 may generated a following instruction based on the user's selection operation, and the following instruction may include position information of two or more followed objects selected by the user in the image.

S1603, controlling the UAV to follow the one or more followed objects indicated by the following instruction such that the one or more followed objects may be in the imaging frame of the imaging device.

In some embodiments, the one or more followed objects may include two or more followed objects.

After the control terminal 25 determines the following instruction in any of the methods described above, the UAV 21 may be controlled to follow the two or more followed objects indicated by the following instruction, such as following the following object 31 and the following object 32. When the UAV is in the process of following the following object 31 and the following object 32, the processor 23 may adjust one or more of the movement direction of the UAV 21, the attitude of the UAV 21, or the attitude of the gimbal of the UAV 21 based on information such as the movement directions of the following object 31 and the following object 32 and the position of the following object 31 and the following object 32. As such, the following object 31 and the following object 32 may be kept in the imaging frame of the imaging device.

In other embodiments, the method may further include detecting the user's confirm follow operation. Further, controlling the UAV to follow the one or more followed objects indicated by the following instruction such that the one or more followed objects may be in the imaging frame of the imaging device may include controlling the UAV to follow the one or more followed objects indicated by the following instruction such that the one or more followed objects may be in the imaging frame of the imaging device after detecting the user's confirm follow operation. In some embodiments, the one or more followed objects may include two or more followed objects.

More specifically, the method may further include displaying an icon to confirm follow, and detecting the user's confirm follow operation may include detecting the user's operation on the confirm follow icon.

As shown in FIG. 8, after the user selects the followed objects 31, 32, 33, and 34, the control terminal 25 may further display a confirm follow icon 40 on the interactive interface 30. When the user clicks the confirm follow icon 40, it may indicate that the UAV 21 is controlled the start following the followed objects 31, 32, 33, and 34. More specifically, after the control terminal 25 detects a user operation such as clicking on the confirm follow icon 40, the control terminal 25 may control the UAV 21 to follow the followed objects 31, 32, 33, and 34. In the process of the UAV 21 following the followed objects 31 and 32, the processor 23 may adjust one or more of the movement direction of the UAV 21, the attitude of the UAV 21, or the attitude of the gimbal of the UAV 21 based on information such as the movement directions of the followed objects 31, 32, 33, and 34, and the position of each following object in the image.

As such, the followed objects 31, 32, 33, and 34 may be kept in the imaging frame of the imaging device.

Figure 17:
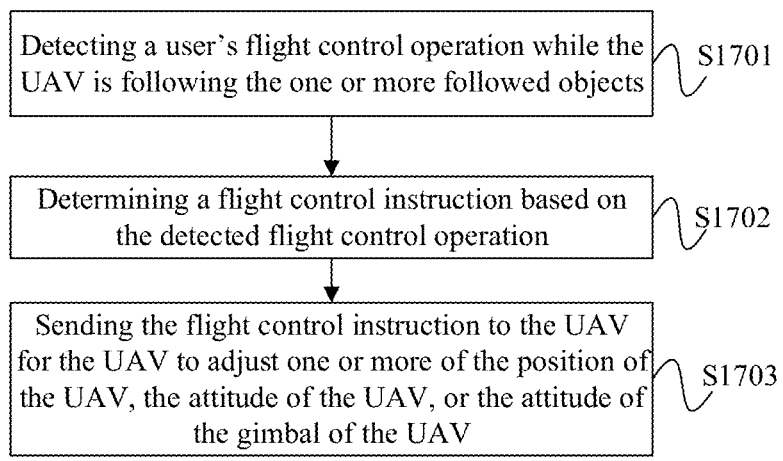
FIG. 17 is a flowchart of the following control method according to yet another embodiment of the present disclosure.

In some embodiments, the method may further include the embodiment shown in FIG. 17.

S1701, detecting a user's flight control operation while the UAV is following the one or more followed objects.

The specific principles and implementation methods of S1701 and S901 are the same, and details are not described herein again.

S1702, determining a flight control instruction based on the detected flight control operation.

The specific principles and implementation methods of S1702 and S902 are the same, and details are not described herein again.

S1703, sending the flight control instruction to the UAV such that the UAV may adjust one or more of the position of the UAV, the attitude of the UAV, or the attitude of the gimbal of the UAV.

The specific principles and implementation methods of S1703 and S903 are the same, and details are not described herein again.

In some embodiments, the method may further include detecting a user's composition selection operation; and determining a composition instruction based on the detection composition selection operation. Further, controlling the UAV to follow the one of more followed objects indicated by the following instruction such that the one or more followed objects may be in the imaging frame of the imaging device may include controlling the UAV to follow the one of more followed objects indicated by the following instruction such that the one or more followed objects may be in the imaging frame of the imaging device based on a composition rule indicated by the composition instruction.

More specifically, the control terminal 25 may also control the UAV 21 to follow two or more followed objects such that the two or more followed objects may be located at a predetermined position in the imaging frame of the imaging device. The specific implementation process is consistent with the embodiment shown in FIG. 11 described above, and details are not described herein again.

In the present embodiment, a control terminal may receive and display an image acquired by an imaging device of a UAV, detect a user's selection operation of two or more followed objects in the image, and determine a following instruction based on the detected selection operation. The following instruction may indicate two or more followed objects such that the UAV may follow the two or more followed objects. As such, the two or more followed objects may be in the imaging frame of the imaging device, such that the UAV may be applied to more imaging scenes, such as a group photo, or ball games or games involving multiple players. Further, the control terminal may detect a user's composition selection operation, and a composition instruction may be determined based on the detected composition selection operation. When the UAV is controlled to follow the two or more followed objects indicated by the following instruction, the two or more followed objects may be located in the imaging frame of the imaging device based on the composition rule indicated by the composition instruction, thereby improving the flexibility of the UAV to follow two or more followed objects.

Figure 18:
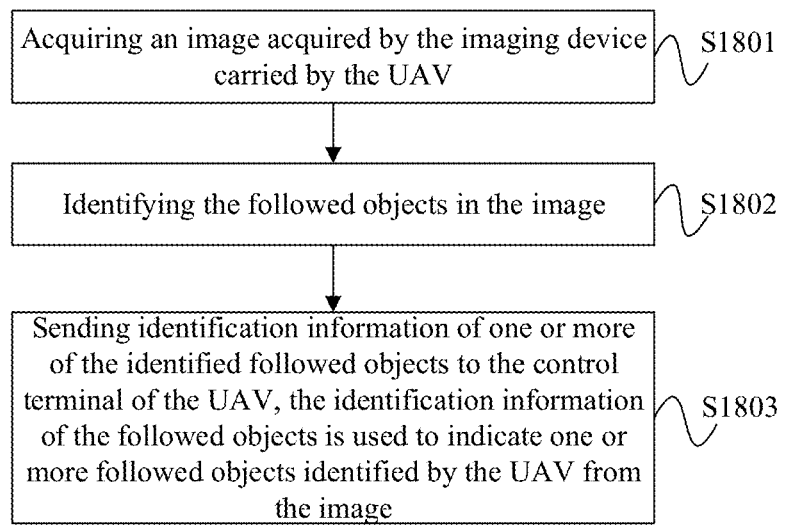
FIG. 18 is a flowchart of the following control method according to still another embodiment of the present disclosure.

An embodiment of the present disclosure provides a following control method. FIG. 18 is a flowchart of the following control method according to still another embodiment of the present disclosure. The following control method provided in the present embodiment can be applied to a UAV. The following control method is described in detail below.

S1801, acquiring an image acquired by the imaging device carried by the UAV.

The specific principles and implementation methods of S1801 and S1201 are the same, and details are not described herein again.

S1802, identifying the followed objects in the image.

The specific principles and implementation methods of S1802 and S1301 are the same, and details are not described herein again.

S1803, sending identification information of one or more of the identified followed objects to the control terminal of the UAV, the identification information of the followed objects may be used to indicate one or more followed objects identified by the UAV from the image.

The specific principles and implementation methods of S1803 and S1302 are the same, and details are not described herein again.

In some embodiments, the one or more followed objects may include two or more followed objects.

More specifically, the following object identification information may include position information of the one or more followed objects identified by the UAV from the image.

For example, the identification information of the followed objects 31, 32, and 34 sent by the UAV 21 to the control terminal 25 may include the position information of the followed objects 31, 32, and 34 in the image.

In some embodiments, the method may further include identifying the type of the followed objects in the image; and sending the type information of the identified one or more followed objects to the control terminal of the UAV. In some embodiments, the one or more followed objects may include two or more followed objects. Identifying the type of the followed objects in the image is consistent with the specific principles and implementation methods of S1401; sending the type information of the identified one or more followed objects to the control terminal of the UAV is consistent with the specific principles and implementation methods of S1402, and will be not repeated herein again.

In some embodiments, the method may further include receiving the following instruction sent by the control terminal of the UAV; and following one or more followed objects indicated by the following instruction such that the one or more followed objects may be in the imaging frame of the imaging device. In some embodiments, the one or more followed objects may include two or more followed objects.

For example, when the control terminal 25 determines the following instruction by using the methods described in the previous embodiments, the following instruction may be sent to the UAV 21, and the following instruction may be used to indicate the two or more followed objects selected by the user. The UAV 21 may follow the two or more followed objects indicated by the following instruction, such as follow the followed objects 31 and 32. While the UAV 21 is following the followed objects 31 and 32, the processor 23 may adjust one or more of the position of the UAV, the attitude of the UAV, or the attitude of the gimbal of the UAV based on information such as the movement directions of the followed objects 31 and 32, and the positions of the followed objects 31 and 32 in the image, such that the followed objects 31 and 32 may be in the imaging frame of the imaging device 22.

In addition, the method may further include receiving a flight control instruction sent by the control terminal of the UAV in the process of following the one or more followed objects; and adjusting one or more of the position of the UAV, the attitude of the UAV, or the attitude of the gimbal of the UAV based on the flight control instruction.

For example, the UAV may receive the flight control instruction from the control terminal 25 when the UAV 21 is in the process of following the followed objects 31, 32, 33, and 34, and adjust one or more of the position of the UAV, the attitude of the UAV, or the attitude of the gimbal of the UAV based on the flight control instruction.

In some embodiments, the method may further include receiving a composition instruction sent by the control terminal of the UAV. Further, following the one or more followed objects such that the one or more followed objects may be in the imaging frame of the imaging device may include following the one or more followed objects such that the one or more followed objects may be in the imaging frame of the imaging device based on a composition rule indicated by the composition instruction.

In some embodiments, the UAV 21 may also receive the composition instruction sent by the control terminal 25. The specific principle and implementation method of the composition instruction are consistent with the above embodiments, and are not repeated here.

Taking the user's selection of the upper right corner as shown in FIG. 11 as an example for description purpose. When the UAV 21 receives the following instruction sent by the control terminal 25, the UAV 21 may follow the two or more followed objects indicated by the following instruction. When the UAV 21 is in the process of following the two or more followed objects, the processor 23 may adjust one or more of the movement direction of the UAV 21, the attitude of the UAV 21, or the attitude of the gimbal of the UAV 21 based on information such as the movement directions of the two or more followed objects, and the positions of the two or more followed objects in the image. As such, the two or more followed objects may be located at the upper right corner of the imaging frame of the imaging device.

In the present embodiment, the UAV may acquire an image acquired by the imaging device carried by the UAV, the image may be sent to the control terminal of the UAV, and two or more followed objects indicated by the following instruction based on the following instruction based sent by the control terminal. As such, the two or more followed objects may be in the imaging frame of the imaging device, such that the UAV may be applied to more imaging scenes, such as a group photo, or ball games or games involving multiple players. Further, the UAV may receive the composition instruction sent by the control terminal, and when following the two or more followed objects indicated by the following instruction, the two or more followed objects may be located in the imaging frame of the imaging device based on the composition rule indicated by the composition instruction, thereby improving the flexibility of the UAV to follow two or more followed objects.

Figure 19:
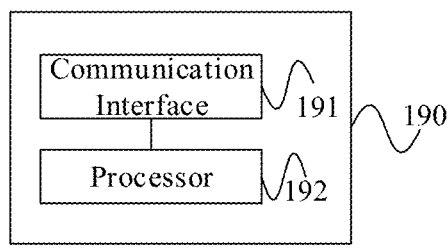
FIG. 19 is a structural diagram of a control terminal of a UAV according to an embodiment of the present disclosure.

An embodiment of the present disclosure provides a control terminal of a UAV. FIG. 19 is a structural diagram of a control terminal of a UAV according to an embodiment of the present disclosure. As shown in FIG. 19, a control terminal 190 of a UAV includes a communication interface 191 and a processor 192.

The communication interface 191 may be configured to receive the image acquired by the imaging device of the UAV. The processor 192 may be configured to display the acquired image acquired by the imaging device of the UAV; detect a user's selection operation on two or more to be followed objects in the image; determine a following instruction based on the detected selection operation; and control the UAV to follow the two or more followed objects indicated by the following instruction such that the two or more followed objects may be in an imaging frame of the imaging device.

In some embodiments, the processor 192 detecting the user's selection operation on two or more to be followed objects in the image may include detecting a user's voice selection operation on two or more to be followed objects in the image. Further, the processor 192 determining the following instruction based on the detected selection operation may include determining the following instruction based on the detected voice selection operation.

In some embodiments, the processor 192 detecting the user's selection operation on two or more to be followed objects in the image may include detecting a user's selection operation of two or more followed objects on an interactive interface displaying the image.

In some embodiments, the communication interface 191 may be further configured to receive the following object identification information sent by the UAV, the following object identification information may be used to indicate one or more followed objects identified by the UAV from the image. The processor 192 may be further configured to identify one or more followed objects identified by the UAV from the image based on the following object identification information.

In some embodiments, the following object identification information may include position information of the one or more followed objects identified by the UAV from the image.

In some embodiments, the processor 192 identifying one or more followed objects identified by the UAV from the image based on the following object identification information may include displaying an icon for identifying the one or more followed objects identified by the UAV from the image based on the following object identification information.

In some embodiments, the one or more followed objects identified by the UAV from the image may include a plurality of followed objects identified by the UAV from the image. The processor detecting the user's selection operation on two or more to be followed objects in the image may include detecting the user's selection operation of two or more followed objects identified by the UAV from the image.

In some embodiments, the detecting the user's selection operation on two or more to be followed objects in the image may include detecting user's selection operation on two or more to be followed objects in the image that are not identified by the UAV from the image.

In some embodiments, the detecting the user's selection operation on two or more to be followed objects in the image may include detecting the user's selection operation of one or more followed objects identified by the UAV from the image, and the selection operation of one or more followed objects not identified by the UAV from the image.

In some embodiments, the communication interface 191 may be further configured to receive type information of one or more followed objects sent by the UAV. The processor 192 may be further configured to identify the type of the one or more followed objects in the image based on the type information of the one or more followed objects.

In some embodiments, the processor 192 may be further configured to detect the user's confirm follow operation. Further, controlling the UAV to follow the two or more followed objects indicated by the following instruction such that the two or more followed objects may be in the imaging frame of the imaging device may include controlling the UAV to follow the two or more followed objects indicated by the following instruction such that the two or more followed objects may be in the imaging frame of the imaging device after detecting the user's confirm follow operation.

In some embodiments, the processor 192 may be further configured to display a confirm follow icon. The processor 192 detecting the user's confirm follow operation may include detecting a user's operation on the confirm follow icon.

In some embodiments, the processor 192 may be further configured to detect the user's flight control operation while the UAV is following the two or more followed objects; and determining a flight control instruction based on the detected flight control operation. The communication interface 191 may be further configured to send the flight control instruction to the UAV such that the UAV may adjust one or more of the position of the UAV, the attitude of the UAV, or the attitude of the gimbal of the UAV.

In some embodiments, the processor 192 may be further configured to detect the user's composition selection; and determining a composition instruction based on the detected composition selection operation. The processor 192 controls the UAV to follow the two or more followed objects indicated by the following instruction such that the two or more followed objects may be in the imaging frame of the imaging device may include controlling the UAV to follow the two or more followed objects indicated by the following instruction such that the two or more followed objects may be in the imaging frame of the imaging device based on a composition rule indicated by the composition instruction.

The specific principles and implementation methods of the control terminal provided in the embodiments of the present disclosure are similar to the embodiments shown in FIG. 1, FIG. 4, and FIG. 9, and details are not described herein again.

In the present embodiment, a control terminal may receive and display an image acquired by an imaging device of a UAV, detect a user's selection operation of two or more followed objects in the image, and determine a following instruction based on the detected selection operation. The following instruction may indicate two or more followed objects such that the UAV may follow the two or more followed objects. As such, the two or more followed objects may be in the imaging frame of the imaging device, such that the UAV may be applied to more imaging scenes, such as a group photo, or ball games or games involving multiple players. Further, the control terminal may receive the following object identification information sent by the UAV, and identify one or more followed objects identified by the UAV from the image based on the following object identification information. As such, the user may be aware of at least the objects in the image that the UAV can follow, thereby improving the user experience. Furthermore, the control terminal may detect a user's composition selection operation, and a composition instruction may be determined based on the detected composition selection operation. When the UAV is controlled to follow the two or more followed objects indicated by the following instruction, the two or more followed objects may be located in the imaging frame of the imaging device based on the composition rule indicated by the composition instruction, thereby improving the flexibility of the UAV to follow two or more followed objects.

Figure 20:
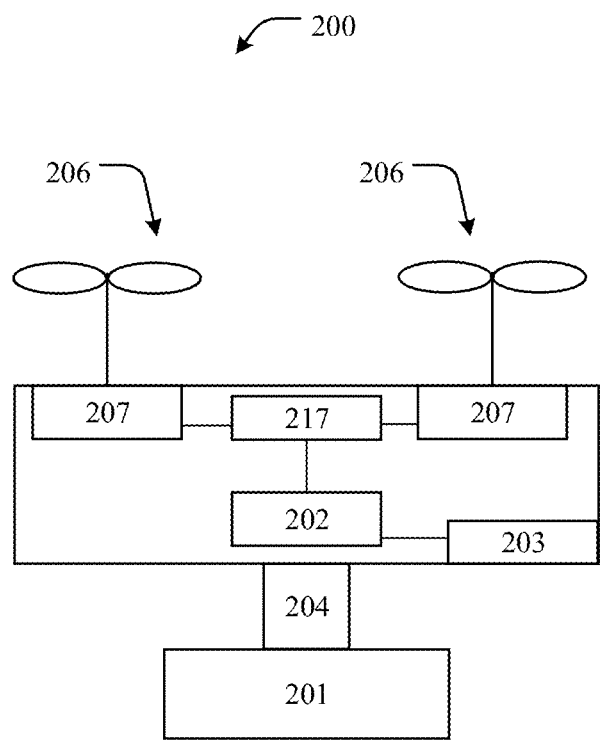
FIG. 20 is a structural diagram of a UAV according to an embodiment of the present disclosure.

An embodiment of the present disclosure provides a UAV. FIG. 20 is a structural diagram of a UAV according to an embodiment of the present disclosure. As shown in FIG. 20, a UAV 200 includes a body, a power system, an imaging device 201, a processor 202, and a communication interface 203. In particular, the imaging device 201 may be mounted on the body through a gimbal 204 and configured to acquire images. The power system may include one or more of a motor 207, a propeller 206, and an electronic speed controller (ESC) 217. The power system may be mounted on the body and configured to provide flying power.

In the present embodiment, the processor 202 may be configured to acquire an image acquired by an imaging device mounted on the UAV. The communication interface 203 may be configured to send the image to a control terminal of the UAV; and receive a following instruction sent by the control terminal of the UAV, the following instruction may be used to indicate two or more followed objects in the image. The processor 202 may be further configured to follow the two or more followed objects such that the two or more followed objects may be in the imaging frame of the imaging device.

In some embodiments, the processor 202 may be further configured to identify the followed objects in the image. The communication interface 203 may be further configured to send identification information of one or more followed objects identified by the processor 202 to the control terminal of the UAV, the identification information of the followed objects may be used to indicate one or more followed objects identified by the UAV from the image.

In some embodiments, the identification information of the followed objects may include position information of the one or more followed objects identified by the UAV from the image.

In some embodiments, the processor 202 may be further configured to identify the type of the followed objects in the image. The communication interface 203 may be further configured to send type information of one or more followed objects identified by the processor 202 to the control terminal of the UAV.

In some embodiments, the communication interface 203 may be further configured to receive a flight control instruction sent by the control terminal of the UAV while the UAV is following the two or more followed objects. The processor 202 may be further configured to adjust one or more of the position of the UAV, the attitude of the UAV, or the attitude of the gimbal of the UAV based on the flight control instruction.

In some embodiments, the communication interface 203 may be further configured to receive a composition instruction sent by the control terminal of the UAV. The processor 202 follows the two or more followed objects such that the two or more followed objects may be in the imaging frame of the imaging device may include following the two or more followed objects such that the two or more followed objects may be in the imaging frame of the imaging device based on a composition rule indicated by the composition instruction.

In some embodiments, the processor 202 may be a flight controller.

The specific principles and implementation methods of the UAV provided in the embodiments of the present disclosure are similar to the embodiments shown in FIG. 12, FIG. 13, and FIG. 14, and details are not described herein again.

In the present embodiment, the UAV may acquire an image acquired by the imaging device carried by the UAV, the image may be sent to the control terminal of the UAV, and two or more followed objects indicated by the following instruction based on the following instruction based sent by the control terminal. As such, the two or more followed objects may be in the imaging frame of the imaging device, such that the UAV may be applied to more imaging scenes, such as a group photo, or ball games or games involving multiple players. Further, the UAV may receive the composition instruction sent by the control terminal, and when following the two or more followed objects indicated by the following instruction, the two or more followed objects may be located in the imaging frame of the imaging device based on the composition rule indicated by the composition instruction, thereby improving the flexibility of the UAV to follow two or more followed objects.

Figure 21:
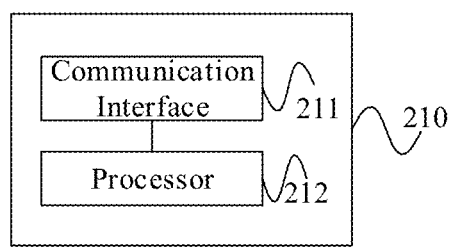
FIG. 21 is a structural diagram of the control terminal of the UAV according to another embodiment of the present disclosure.

An embodiment of the present disclosure provides a control terminal for a UAV. FIG. 21 is a structural diagram of the control terminal of the UAV according to another embodiment of the present disclosure. As shown in FIG. 21, a control terminal 210 includes a communication interface 211 and a processor 212. The communication interface 211 may be configured to receive an image acquired by an imaging device of the UAV; and receive the following object identification information sent by the UAV, the following object identification information being used to indicate one or more followed objects identified by the UAV from the image. The processor 212 may be configured to display the acquired image acquired by the imaging device of the UAV; identify, in the image, the one or more followed objects identified by the UAV from the image based on the following object identification information.

In some embodiments, the identification information of the followed objects may include position information of the one or more followed objects identified by the UAV from the image.

In some embodiments, the processor 212 identified the one or more followed objects identified by the UAV from the image based on the following object identification information may include displaying an icon for identifying, in the image, the one or more followed objects identified by the UAV from the image based on the following object identification information.

In some embodiments, the communication interface 211 may be further configured to receive type information of one or more followed objects sent by the UAV. The processor 212 may be further configured to identify the type of the one or more followed objects in the image based on the type information of the one or more followed objects.

In some embodiments, the processor 212 may be further configured to detect a user's selection operation on one or more followed objects in the image; determine a following instruction based on the detected selection operation; and control the UAV to follow the one or more followed objects indicated by the following instruction such that the two or more followed objects may be in an imaging frame of the imaging device.

In some embodiments, the processor 212 detecting the user's selection operation on one or more followed objects in the image may include detecting a user's voice selection operation on one or more followed objects in the image. Further, the processor 212 determining the following instruction based on the detected selection operation may include determining the following instruction based on the detected voice selection operation.

In some embodiments, the processor 212 detecting the user's selection operation on one or more followed objects in the image may include detecting a user's selection operation of one or more followed objects on an interactive interface displaying the image.

In some embodiments, the processor 212 detecting the user's selection operation on one or more followed objects in the image may include detecting the user's selection operation of one or more followed objects identified by the UAV from the image.

In some embodiments, the processor 212 detecting the user's selection operation on one or more followed objects in the image may include detecting the user's selection operation of one or more followed objects not identified by the UAV from the image.

In some embodiments, may be further configured to detect a user's confirm follow operation. The processor 212 controls the UAV to follow the one or more followed objects indicated by the following instruction such that the one or more followed objects may be in the imaging frame of the imaging device may include controlling the UAV to follow the one or more followed objects indicated by the following instruction such that the one or more followed objects may be in the imaging frame of the imaging device after detecting the user's confirm follow operation.

In some embodiments, the processor 212 may be further configured to display a confirm follow icon. The processor 212 detecting the user's confirm follow operation may include detecting a user's operation on the confirm follow icon.

In some embodiments, the processor 212 may be further configured to detect the user's flight control operation while the UAV is following the one or more followed objects; and determining a flight control instruction based on the detected flight control operation. The communication interface 211 may be further configured to send the flight control instruction to the UAV such that the UAV may adjust one or more of the position of the UAV, the attitude of the UAV, or the attitude of the gimbal of the UAV.

In some embodiments, the processor 212 may be further configured to detect the user's composition selection; and determining a composition instruction based on the detected composition selection operation. The processor 212 controls the UAV to follow the one or more followed objects indicated by the following instruction such that the one or more followed objects may be in the imaging frame of the imaging device may include controlling the UAV to follow the one or more followed objects indicated by the following instruction such that the one or more followed objects may be in the imaging frame of the imaging device based on a composition rule indicated by the composition instruction.

In some embodiments, the one or more followed objects may include two or more followed objects.

The specific principles and implementation methods of the control terminal provided in the embodiments of the present disclosure are similar to the embodiments shown in FIG. 15, FIG. 16, and FIG. 17, and details are not described herein again.

In the present embodiment, the control terminal may receive the following object identification information sent by the UAV, and identify, in the image, one or more followed objects indicated by the followed objects identification information and identified by the UAV from the image based on the following object identification information. As such, the user can be aware of at least the objects in the image that the UAV can follow, thereby improving the user experience.

An embodiment of the present disclosure provides a UAV. FIG. 20 is a structural diagram of a UAV according to an embodiment of the present disclosure. As shown in FIG. 20, a UAV 200 includes a body, a power system, an imaging device 201, a processor 202, and a communication interface 203. In particular, the imaging device 201 may be mounted on the body through a gimbal 204 and configured to acquire images. The power system may include one or more of a motor 207, a propeller 206, and an electronic speed controller (ESC) 217. The power system may be mounted on the body and configured to provide flying power.

In the present embodiment, the processor 202 may be configured to acquire an image acquired by an imaging device mounted on the UAV; and identify the followed objects in the image. The communication interface 203 may be configured to send identification information of the identified one or more followed objects to the control terminal of the UAV, the identification information of the followed objects may be used to indicate one or more followed objects identified by the UAV from the image.

In some embodiments, the identification information of the followed objects may include position information of the one or more followed objects identified by the UAV from the image.

In some embodiments, the processor 202 may be further configured to identify the type of the followed objects in the image. The communication interface 203 may be configured to send the type information of the one or more identified followed objects to the control terminal of the UAV.

In some embodiments, the communication interface 203 may be further configured to receive a following instruction sent by the control terminal of the UAV. The processor 202 may be further configured to follow one or more followed objects indicated by the following instruction such that the one or more followed objects may be in the imaging frame of the imaging device.

In some embodiments, the communication interface 203 may be further configured to receive a flight control instruction sent by the control terminal of the UAV. The processor 202 may be further configured to adjust one or more of the position of the UAV, the attitude of the UAV, or the attitude of the gimbal of the UAV based on the flight control instruction.

In some embodiments, the communication interface 203 may be further configured to receive a composition instruction sent by the control terminal of the UAV. The processor 202 follows the one or more followed objects indicated by the following instruction such that the one or more followed objects may be in the imaging frame of the imaging device may include following the one or more followed objects indicated by the following instruction such that the one or more followed objects may be in the imaging frame of the imaging device based on a composition rule indicated by the composition instruction.

In some embodiments, the one or more followed objects may include two or more followed objects.

The specific principles and implementation methods of the UAV provided in the embodiments of the present disclosure are similar to the embodiments shown in FIG. 18, and details are not described herein again.

In the present embodiment, the UAV may acquire an image acquired by the imaging device carried by the UAV, the image may be sent to the control terminal of the UAV, and two or more followed objects indicated by the following instruction based on the following instruction based sent by the control terminal. As such, the two or more followed objects may be in the imaging frame of the imaging device, such that the UAV may be applied to more imaging scenes, such as a group photo, or ball games or games involving multiple players. Further, the UAV may receive the composition instruction sent by the control terminal, and when following the two or more followed objects indicated by the following instruction, the two or more followed objects may be located in the imaging frame of the imaging device based on the composition rule indicated by the composition instruction, thereby improving the flexibility of the UAV to follow two or more followed objects.

In the several embodiments provided by the present disclosure, it should be understood that the disclosed apparatus and method may be implemented in other manners. For example, the apparatus embodiments described above are merely illustrative. For example, the unit division is merely logical function division and there may be other division in actual implementation. For example, multiple units or components may be combined or integrated into another system, or some features can be omitted or not be executed. In addition, the mutual coupling or the direct coupling or the communication connection as shown or discussed may be indirect coupling or communication connection through some interfaces, devices or units, and may be in electrical, mechanical or other forms.

The units described as separate components may or may not be physically separated. The components displayed as units may or may not be physical units, that is, may be located in one place or may also be distributed to multiple network units. Some or all of the units may be selected according to actual needs to achieve the objectives of the solution in the disclosure.

In addition, each functional unit in each embodiment of the present disclosure may be integrated into one processing unit, or each unit may exist alone physically, or two or more units may be integrated in one unit. The above-mentioned integrated unit can be implemented in the form of hardware or in the form of hardware plus software functional unit The above-described integrated unit implemented in the form of a software functional unit may be stored in a computer-readable storage medium. The software function unit is stored in a storage medium and includes several instructions for enabling a computer device (which may be a personal computer, a server, a network device, etc.) or a processor to execute some steps of the method according to each embodiment of the present disclosure. The foregoing storage medium includes a medium capable of storing program code, such as a USB flash disk, a removable hard disk, a read-only memory (ROM), a random access memory (RAM), a magnetic disk, an optical disc, or the like.

Those skilled in the art may clearly understand that, for convenience and brevity of description, the division of the foregoing functional modules is only used as an example. In practical applications, however, the above function allocation may be performed by different functional modules according to actual needs. That is, the internal structure of the device is divided into different functional modules to accomplish all or part of the functions described above. For the working process of the foregoing apparatus, reference may be made to the corresponding process in the foregoing method embodiments, and details are not described herein again.

Finally, it should be noted that the foregoing embodiments are merely intended for describing the technical solutions of the present disclosure, but not to limit the present disclosure. Although the present disclosure is described in detail with reference to the foregoing embodiments, it should be understood by those of ordinary skill in the art that the technical solutions described in the foregoing embodiments may still be modified, or a part or all of the technical features may be equivalently replaced without departing from the spirit and scope of the present disclosure. As a result, these modifications or replacements do not make the essence of the corresponding technical solutions depart from the scope of the technical solutions of the present disclosure.

What is claimed is:

1. A following control method comprising:
receiving and displaying an acquired image acquired by an imaging device of an unmanned aerial vehicle (UAV);
receiving following object identification information sent by the UAV, the following object identification information being used to indicate one or more identified objects identified by the UAV from the image;
displaying one or more icons, each representing one of the one or more identified objects identified by the UAV from the image based on the following object identification information;
detecting a user's selection operation on two or more selected objects of a plurality of following objects in the image, the plurality of following objects including the one or more identified objects represented by the one or more icons;
determining a following instruction based on the detected selection operation to follow the two or more selected objects; and
controlling the UAV to follow the two or more selected objects indicated by the following instruction so that the two or more selected objects are in an imaging frame of the imaging device.

2. The method of claim 1, wherein:
detecting the user's selection operation on the two or more selected objects of the plurality of following objects in the image includes:
detecting a user's voice selection operation on the two or more selected objects of the plurality of following objects in the image; and
determining the following instruction based on the detected selection operation includes:
determining the following instruction based on the detected voice selection operation.

3. The method of claim 1, wherein detecting the user's selection operation on the two or more selected objects of the plurality of following objects in the image includes detecting the user's selection operation on the two or more selected objects of the plurality of following objects on an interactive interface displaying the image.

4. The method of claim 1, wherein the following object identification information includes position information of the one or more identified objects identified by the UAV from the image.

5. The method of claim 1, wherein:
the one or more identified objects include a plurality of identified objects identified by the UAV from the image; and
detecting the user's selection operation on the two or more selected objects of the plurality of following objects in the image includes:
detecting, in the image, the user's selection operation on two or more of the plurality of identified objects identified by the UAV from the image.

6. The method of claim 1, wherein:
the plurality of following objects include a plurality of other objects in the image not being identified by the UAV from the image; and
detecting the user's selection operation on the two or more selected objects of the plurality of following objects in the image includes:
detecting the user's selection operation on two or more of the plurality of other objects in the image not being identified by the UAV from the image.

7. The method of claim 1, wherein:
the plurality of following objects include one or more other objects in the image not being identified by the UAV from the image; and
detecting the user's selection operation on the two or more selected objects of the plurality of following objects in the image includes:
detecting the user's selection operation on at least one of the one or more identified objects identified by the UAV from the image, and detecting the selection operation on at least one of the one or more other objects not being identified by the UAV from the image.

8. The method of claim 1, further comprising:
receiving type information of the one or more identified objects sent by the UAV; and
identifying a type of the one or more identified objects in the image based on the type information of one or more identified objects.

9. The method of claim 1, further comprising:
detecting a user's confirm follow operation;
wherein controlling the UAV to follow the two or more selected objects indicated by the following instruction so that the two or more selected objects are in the imaging frame of the imaging device includes;
controlling the UAV to follow the two or more selected objects indicated by the following instruction so that the two or more selected objects are in the imaging frame of the imaging device after detecting the user's confirm follow operation.

10. The method of claim 9, further comprising:
displaying a confirm follow icon; and
detecting the user's confirm follow operation includes detecting a user's operation on the confirm follow icon.

11. The method of claim 1, further comprising detecting a user's flight control operation while the UAV is following the two or more selected objects;
determining a flight control instruction based on the detected flight control operation; and
sending the flight control instruction to the UAV for the UAV to adjust one or more of a position of the UAV, an attitude of the UAV, or an attitude of a gimbal of the UAV based on the flight control instruction.

12. The method of claim 1, further comprising:
detecting a user's composition selection operation; and
determining a composition instruction based on the detected composition selection operation;
wherein controlling the UAV to follow the two or more selected objects indicated by the following instruction so that the two or more selected objects are in the imaging frame of the imaging device includes:
controlling the UAV to follow the two or more selected objects indicated by the following instruction so that the two or more selected objects are in the imaging frame of the imaging device based on a composition rule indicated by the composition instruction.

13. The following control method of claim 1, wherein:
the one or more identified objects include a plurality of identified objects identified by the UAV from the image based on the following object identification information;
displaying the one or more icons includes displaying a plurality of icons each representing one of the plurality of identified objects; and
detecting the user's selection operation on the two or more selected objects of the plurality of following objects includes:
detecting the user's selection operation on two or more of the plurality of identified objects by detecting the user's selection operation on two or more of the plurality of icons.

14. The following control method of claim 1, wherein:
the one or more icons are one or more first icons, each representing one of the one or more identified objects identified by the UAV from the image based on the following object identification information;
the plurality of following objects further include a plurality of other objects in the image not being identified by the UAV from the image, the plurality of other objects being represented by a plurality of second icons; and
detecting the user's selection operation on the two or more selected objects of the plurality of following objects includes:
detecting the user's selection operation on two or more of the plurality of other objects in the image not being identified by the UAV from the image by detecting the user's selection operation on two or more of the plurality of second icons.

15. The following control method of claim 1, wherein:
the one or more icons are one or more first icons, each representing one of the one or more identified objects identified by the UAV from the image based on the following object identification information;
the plurality of following objects further include one or more other objects in the image not being identified by the UAV from the image, the one or more other objects being represented by one or more second icons; and
detecting the user's selection operation on the two or more selected objects of the plurality of following objects includes:
detecting the user's selection operation on one of the one or more identified objects by detecting the user's selection operation on one of the one or more first icons, and detecting the user's operation on one of the one or more other objects by detecting the user's selection operation on one of the one or more second icons.

16. A control terminal of an unmanned aerial vehicle (UAV) comprising:
a communication interface configured to:
receive an acquired image acquired by an imaging device of the UAV; and
receive following object identification information sent by the UAV, the following object identification information being used to indicate one or more identified objects identified by the UAV from the image;
a processor configured to:
display the acquired image acquired by the imaging device of the UAV;
display one or more icons, each representing one of the one or more identified objects identified by the UAV from the image based on the following object identification information;
detect a user's selection operation on two or more selected objects of a plurality of following objects in the image, the plurality of following objects including the one or more identified objects represented by the one or more icons;
determine a following instruction based on the detected selection operation to follow the two or more selected objects; and
control the UAV to follow the two or more selected objects indicated by the following instruction so that the two or more selected objects are in an imaging frame of the imaging device.

17. The control terminal of claim 16, wherein the processor is further configured to:
detect a user's voice selection operation on the two or more selected objects of the plurality of following objects in the image; and
determine the following instruction based on the detected voice selection operation.

18. The control terminal of claim 16, wherein the processor is further configured to detect the user's selection operation on the two or more selected objects of the plurality of following objects on an interactive interface displaying the image.

19. The control terminal of claim 16, wherein the following object identification information includes position information of the one or more identified objects identified by the UAV from the image.

20. The control terminal of claim 16, wherein:
the one or more identified objects include a plurality of identified objects identified by the UAV from the image; and
the processor is configured to detect, in the image, the user's selection operation on two or more of the plurality of identified objects identified by the UAV from the image.

21. The control terminal of claim 16, wherein:
the plurality of following objects include a plurality of other objects in the image not being identified by the UAV from the image; and
the processer is configured to detect the user's selection operation on two or more of the plurality of other objects in the image not being identified by the UAV from the image.

* * * * *